United States Patent
Haddad et al.

(10) Patent No.: US 9,939,251 B2
(45) Date of Patent: Apr. 10, 2018

(54) THREE DIMENSIONAL IMAGING UTILIZING STACKED IMAGER DEVICES AND ASSOCIATED METHODS

(71) Applicant: SiOnyx, Inc., Beverly, MA (US)

(72) Inventors: Homayoon Haddad, Beaverton, OR (US); Chen Feng, Snohomish, WA (US); Leonard Forbes, Corvallis, OR (US)

(73) Assignee: SiOnyx, LLC, Beverly, MA (US)

( * ) Notice: Subject to any disclaimer, the term of this patent is extended or adjusted under 35 U.S.C. 154(b) by 486 days.

(21) Appl. No.: 14/206,890

(22) Filed: Mar. 12, 2014

(65) Prior Publication Data
US 2014/0307059 A1  Oct. 16, 2014

Related U.S. Application Data

(60) Provisional application No. 61/798,805, filed on Mar. 15, 2013.

(51) Int. Cl.
*G01B 11/02* (2006.01)
*H04N 13/02* (2006.01)
(Continued)

(52) U.S. Cl.
CPC ............ *G01B 11/026* (2013.01); *G06T 7/557* (2017.01); *G06T 7/571* (2017.01);
(Continued)

(58) Field of Classification Search
None
See application file for complete search history.

(56) References Cited

U.S. PATENT DOCUMENTS

| 3,487,223 A | 12/1969 | St. John |
| 3,922,571 A | 11/1975 | Smith |

(Continued)

FOREIGN PATENT DOCUMENTS

| AU | 3666484 | 6/1985 |
| CN | 101404307 | 4/2009 |

(Continued)

OTHER PUBLICATIONS

International Search Report, dated Aug. 18, 2014, in corresponding PCT/US2014/024964 (3 pages).

(Continued)

*Primary Examiner* — Stephen Coleman
(74) *Attorney, Agent, or Firm* — Thomas J. Engellenner; Reza Mollaaghababa; Pepper Hamilton LLP

(57) ABSTRACT

Stacked imager devices that can determine distance and generate three dimensional representations of a subject and associated methods are provided. In one aspect, an imaging system can include a first imager array having a first light incident surface and a second imager array having a second light incident surface. The second imager array can be coupled to the first imager array at a surface that is opposite the first light incident surface, with the second light incident surface being oriented toward the first imager array and at least substantially uniformly spaced. The system can also include a system lens positioned to direct incident light along an optical pathway onto the first light incident surface. The first imager array is operable to detect a first portion of the light passing along the optical pathway and to pass through a second portion of the light, where the second imager array is operable to detect at least a part of the second portion of light.

22 Claims, 5 Drawing Sheets

(51) Int. Cl.
*G06T 7/571* (2017.01)
*G06T 7/557* (2017.01)
(52) U.S. Cl.
CPC ..... *H04N 13/0235* (2013.01); *H04N 13/0271* (2013.01); *G06T 2207/10148* (2013.01)

(56) References Cited

U.S. PATENT DOCUMENTS

| | | |
|---|---|---|
| 3,973,994 A | 8/1976 | Redfield |
| 3,994,012 A | 11/1976 | Warner, Jr. |
| 4,017,887 A | 4/1977 | Davies et al. |
| 4,149,174 A | 4/1979 | Shannon |
| 4,176,365 A | 11/1979 | Kroger |
| 4,201,450 A | 5/1980 | Trapani |
| 4,242,149 A | 12/1980 | King et al. |
| 4,253,882 A | 3/1981 | Dalal |
| 4,277,793 A | 7/1981 | Webb |
| 4,322,571 A | 3/1982 | Stanbery |
| 4,419,533 A | 12/1983 | Czubatyj et al. |
| 4,452,826 A | 6/1984 | Shields et al. |
| 4,493,942 A | 1/1985 | Sheng et al. |
| 4,514,582 A | 4/1985 | Tiedje et al. |
| 4,536,608 A | 8/1985 | Sheng et al. |
| 4,568,960 A | 2/1986 | Petroff et al. |
| 4,593,303 A | 6/1986 | Dyck et al. |
| 4,593,313 A | 6/1986 | Nagasaki |
| 4,617,593 A | 10/1986 | Dudley |
| 4,630,082 A | 12/1986 | Sakai |
| 4,648,936 A | 3/1987 | Ashby et al. |
| 4,663,188 A | 5/1987 | Kane |
| 4,672,206 A | 6/1987 | Suzuki |
| 4,673,770 A | 6/1987 | Mandelkorn |
| 4,679,068 A | 7/1987 | Lillquist et al. |
| 4,751,571 A | 6/1988 | Lillquist |
| 4,775,425 A | 10/1988 | Guha et al. |
| 4,777,490 A | 10/1988 | Sharma et al. |
| 4,829,013 A | 5/1989 | Yamazaki |
| 4,883,962 A | 11/1989 | Elliot |
| 4,886,958 A | 12/1989 | Merryman |
| 4,887,255 A | 12/1989 | Handa et al. |
| 4,894,526 A | 1/1990 | Bethea et al. |
| 4,910,568 A | 3/1990 | Taki et al. |
| 4,910,588 A | 3/1990 | Kinoshita et al. |
| 4,964,134 A | 10/1990 | Westbrook et al. |
| 4,965,784 A | 10/1990 | Land et al. |
| 4,968,372 A | 11/1990 | Maass |
| 4,999,308 A | 3/1991 | Nishiura et al. |
| 5,021,100 A | 6/1991 | Ishihara et al. |
| 5,021,854 A | 6/1991 | Huth |
| 5,080,725 A | 1/1992 | Green et al. |
| 5,081,049 A | 1/1992 | Green et al. |
| 5,100,478 A | 3/1992 | Kawabata |
| 5,101,260 A | 3/1992 | Nath |
| 5,114,876 A | 5/1992 | Weiner |
| 5,127,964 A | 7/1992 | Hamakawa et al. |
| 5,164,324 A | 11/1992 | Russell et al. |
| 5,208,822 A | 5/1993 | Haus et al. |
| 5,223,043 A | 6/1993 | Olson et al. |
| 5,234,790 A | 8/1993 | Lang et al. |
| 5,236,863 A | 8/1993 | Iranmanesh |
| 5,244,817 A | 9/1993 | Hawkins et al. |
| 5,296,045 A | 3/1994 | Banerjee et al. |
| 5,309,275 A | 5/1994 | Nishimura et al. |
| 5,322,988 A | 6/1994 | Russell et al. |
| 5,346,850 A | 9/1994 | Kaschmitter et al. |
| 5,351,446 A | 10/1994 | Langsdorf |
| 5,370,747 A | 12/1994 | Noguchi et al. |
| 5,373,182 A | 12/1994 | Norton |
| 5,381,431 A | 1/1995 | Zayhowski |
| 5,383,217 A | 1/1995 | Uemura |
| 5,390,201 A | 2/1995 | Tomono et al. |
| 5,410,168 A | 4/1995 | Hisa |
| 5,413,100 A | 5/1995 | Barthelemy et al. |
| 5,449,626 A | 9/1995 | Hezel |
| 5,454,347 A | 10/1995 | Shibata et al. |
| 5,502,329 A | 3/1996 | Pezzani |
| 5,523,570 A | 6/1996 | Hairston |
| 5,559,361 A | 9/1996 | Pezzani |
| 5,569,615 A | 10/1996 | Yamazaki et al. |
| 5,578,858 A | 11/1996 | Mueller et al. |
| 5,580,615 A | 12/1996 | Itoh et al. |
| 5,589,008 A | 12/1996 | Kepper |
| 5,589,704 A | 12/1996 | Levine |
| 5,597,621 A | 1/1997 | Hummel et al. |
| 5,600,130 A | 2/1997 | VanZeghbroeck |
| 5,626,687 A | 5/1997 | Campbell |
| 5,627,081 A | 5/1997 | Tsuo et al. |
| 5,635,089 A | 6/1997 | Singh et al. |
| 5,640,013 A | 6/1997 | Ishikawa et al. |
| 5,641,362 A | 6/1997 | Meier |
| 5,641,969 A | 6/1997 | Cook et al. |
| 5,705,413 A | 1/1998 | Harkin et al. |
| 5,705,828 A | 1/1998 | Noguchi et al. |
| 5,708,486 A | 1/1998 | Miyawaki et al. |
| 5,710,442 A | 1/1998 | Watanabe et al. |
| 5,714,404 A | 2/1998 | Mititsky et al. |
| 5,727,096 A | 3/1998 | Ghirardi et al. |
| 5,731,213 A | 3/1998 | Ono |
| 5,751,005 A | 5/1998 | Wyles et al. |
| 5,758,644 A | 6/1998 | Diab et al. |
| 5,766,127 A | 6/1998 | Pologe et al. |
| 5,766,964 A | 6/1998 | Rohatgi et al. |
| 5,773,820 A | 6/1998 | Osajda et al. |
| 5,779,631 A | 7/1998 | Chance |
| 5,781,392 A | 7/1998 | Clark |
| 5,792,280 A | 8/1998 | Ruby et al. |
| 5,808,350 A | 9/1998 | Jack et al. |
| 5,859,446 A | 1/1999 | Nagasu et al. |
| 5,861,639 A | 1/1999 | Bernier |
| 5,923,071 A | 7/1999 | Saito |
| 5,935,320 A | 8/1999 | Graf et al. |
| 5,942,789 A | 8/1999 | Morikawa |
| 5,943,584 A | 8/1999 | Shim et al. |
| 5,963,790 A | 10/1999 | Matsuno et al. |
| 5,977,603 A | 11/1999 | Ishikawa |
| 6,071,796 A | 6/2000 | Voutsas |
| 6,072,117 A | 6/2000 | Matsuyama et al. |
| 6,080,988 A | 6/2000 | Ishizuya et al. |
| 6,082,858 A | 7/2000 | Grace et al. |
| 6,097,031 A | 8/2000 | Cole |
| 6,106,689 A | 8/2000 | Matsuyama |
| 6,107,618 A | 8/2000 | Fossum et al. |
| 6,111,300 A | 8/2000 | Cao et al. |
| 6,147,297 A | 11/2000 | Wettling et al. |
| 6,160,833 A | 12/2000 | Floyd et al. |
| 6,168,965 B1 | 1/2001 | Malinovich et al. |
| 6,194,722 B1 | 2/2001 | Fiorini et al. |
| 6,204,506 B1 | 3/2001 | Akahori et al. |
| 6,229,192 B1 | 5/2001 | Gu |
| 6,252,256 B1 | 6/2001 | Ugge et al. |
| 6,290,713 B1 | 9/2001 | Russell |
| 6,291,302 B1 | 9/2001 | Yu |
| 6,313,901 B1 | 11/2001 | Cacharelis |
| 6,320,296 B1 | 11/2001 | Fujii et al. |
| 6,327,022 B1 | 12/2001 | Nishi |
| 6,331,445 B1 | 12/2001 | Janz et al. |
| 6,331,885 B1 | 12/2001 | Nishi |
| 6,340,281 B1 | 1/2002 | Haraguchi |
| 6,372,591 B1 | 4/2002 | Mineji et al. |
| 6,372,611 B1 | 4/2002 | Horikawa |
| 6,379,979 B1 | 4/2002 | Connolly |
| 6,420,706 B1 | 7/2002 | Lurie et al. |
| 6,429,036 B1 | 8/2002 | Nixon et al. |
| 6,429,037 B1 | 8/2002 | Wenham et al. |
| 6,465,860 B2 | 10/2002 | Shigenaka et al. |
| 6,475,839 B2 | 11/2002 | Zhang et al. |
| 6,483,116 B1 | 11/2002 | Kozlowski et al. |
| 6,483,929 B1 | 11/2002 | Marakami et al. |
| 6,486,522 B1 | 11/2002 | Bishay et al. |
| 6,493,567 B1 | 12/2002 | Krivitski et al. |
| 6,498,336 B1 | 12/2002 | Tian et al. |
| 6,500,690 B1 | 12/2002 | Yamagishi et al. |
| 6,504,178 B2 | 1/2003 | Carlson et al. |
| 6,580,053 B1 | 6/2003 | Voutsas |

(56) References Cited

U.S. PATENT DOCUMENTS

| | | |
|---|---|---|
| 6,583,936 B1 | 6/2003 | Kaminsky et al. |
| 6,597,025 B2 | 7/2003 | Lauter et al. |
| 6,607,927 B2 | 8/2003 | Ramappa et al. |
| 6,624,049 B1 | 9/2003 | Yamazaki |
| 6,639,253 B2 | 10/2003 | Duane et al. |
| 6,667,528 B2 | 12/2003 | Cohen et al. |
| 6,677,655 B2 | 1/2004 | Fitzgerald |
| 6,677,656 B2 | 1/2004 | Francois |
| 6,683,326 B2 | 1/2004 | Iguchi et al. |
| 6,689,209 B2 | 2/2004 | Falster et al. |
| 6,753,585 B1 | 6/2004 | Kindt |
| 6,759,262 B2 | 7/2004 | Theil et al. |
| 6,790,701 B2 | 9/2004 | Shigenaka et al. |
| 6,800,541 B2 | 10/2004 | Okumura |
| 6,801,799 B2 | 10/2004 | Mendelson |
| 6,803,555 B1 | 10/2004 | Parrish et al. |
| 6,815,685 B2 | 11/2004 | Wany |
| 6,818,535 B2 | 11/2004 | Lu et al. |
| 6,822,313 B2 | 11/2004 | Matsushita |
| 6,825,057 B1 | 11/2004 | Heyers et al. |
| 6,864,156 B1 | 3/2005 | Conn |
| 6,864,190 B2 | 3/2005 | Han et al. |
| 6,867,806 B1 | 3/2005 | Lee et al. |
| 6,900,839 B1 | 5/2005 | Kozlowski et al. |
| 6,907,135 B2 | 6/2005 | Gifford |
| 6,911,375 B2 | 6/2005 | Guarini et al. |
| 6,919,587 B2 | 7/2005 | Ballon et al. |
| 6,923,625 B2 | 8/2005 | Sparks |
| 6,927,432 B2 | 8/2005 | Holm et al. |
| 6,984,816 B2 | 1/2006 | Holm et al. |
| 7,008,854 B2 | 3/2006 | Forbes |
| 7,041,525 B2 | 5/2006 | Clevenger et al. |
| 7,057,256 B2 | 6/2006 | Carey, III et al. |
| 7,075,079 B2 | 7/2006 | Wood |
| 7,091,411 B2 | 8/2006 | Falk et al. |
| 7,109,517 B2 | 9/2006 | Zaidi |
| 7,126,212 B2 | 10/2006 | Enquist et al. |
| 7,132,724 B1 | 11/2006 | Merrill |
| 7,202,102 B2 | 4/2007 | Yao |
| 7,211,501 B2 | 5/2007 | Liu et al. |
| 7,235,812 B2 | 6/2007 | Chu et al. |
| 7,247,527 B2 | 7/2007 | Shimomura et al. |
| 7,247,812 B2 | 7/2007 | Tsao |
| 7,256,102 B2 | 8/2007 | Nakata et al. |
| 7,271,445 B2 | 9/2007 | Forbes |
| 7,271,835 B2 | 9/2007 | Iizuka et al. |
| 7,285,482 B2 | 10/2007 | Ochi |
| 7,314,832 B2 | 1/2008 | Kountz et al. |
| 7,354,792 B2 | 4/2008 | Carey, III et al. |
| 7,358,498 B2 | 4/2008 | Geng et al. |
| 7,375,378 B2 | 5/2008 | Manivannan et al. |
| 7,390,689 B2 | 6/2008 | Mazur et al. |
| 7,432,148 B2 | 10/2008 | Li et al. |
| 7,442,629 B2 | 10/2008 | Mazur et al. |
| 7,446,359 B2 | 11/2008 | Lee et al. |
| 7,446,807 B2 | 11/2008 | Hong |
| 7,456,452 B2 | 11/2008 | Wells et al. |
| 7,482,532 B2 | 1/2009 | Yi et al. |
| 7,498,650 B2 | 3/2009 | Lauxtermann |
| 7,504,325 B2 | 3/2009 | Koezuka et al. |
| 7,504,702 B2 | 3/2009 | Mazur et al. |
| 7,511,750 B2 | 3/2009 | Murakami |
| 7,521,737 B2 | 4/2009 | Augusto |
| 7,528,463 B2 | 5/2009 | Forbes |
| 7,542,085 B2 | 6/2009 | Altice, Jr. et al. |
| 7,547,616 B2 | 6/2009 | Fogel et al. |
| 7,551,059 B2 | 6/2009 | Farrier |
| 7,560,750 B2 | 7/2009 | Niira et al. |
| 7,564,631 B2 | 7/2009 | Li et al. |
| 7,582,515 B2 | 9/2009 | Choi et al. |
| 7,592,593 B2 | 9/2009 | Kauffman et al. |
| 7,595,213 B2 | 9/2009 | Kwon et al. |
| 7,605,397 B2 | 10/2009 | Kindem et al. |
| 7,615,808 B2 | 11/2009 | Pain et al. |
| 7,618,839 B2 | 11/2009 | Rhodes |
| 7,619,269 B2 | 11/2009 | Ohkawa |
| 7,629,582 B2 | 12/2009 | Hoffman et al. |
| 7,648,851 B2 | 1/2010 | Fu et al. |
| 7,649,156 B2 | 1/2010 | Lee |
| 7,705,879 B2 | 4/2010 | Kerr et al. |
| 7,731,665 B2 | 6/2010 | Lee et al. |
| 7,741,666 B2 | 6/2010 | Nozaki et al. |
| 7,745,901 B1 | 6/2010 | McCaffrey et al. |
| 7,763,913 B2 | 7/2010 | Fan et al. |
| 7,772,028 B2 | 8/2010 | Adkisson et al. |
| 7,781,856 B2 | 8/2010 | Mazur et al. |
| 7,800,192 B2 | 9/2010 | Venezia et al. |
| 7,800,684 B2 | 9/2010 | Tatani |
| 7,816,220 B2 | 10/2010 | Mazur et al. |
| 7,828,983 B2 | 11/2010 | Weber et al. |
| 7,847,253 B2 | 12/2010 | Carey et al. |
| 7,847,326 B2 | 12/2010 | Park et al. |
| 7,855,406 B2 | 12/2010 | Yamaguchi et al. |
| 7,875,498 B2 | 1/2011 | Elbanhawy et al. |
| 7,880,168 B2 | 2/2011 | Lenchenkov |
| 7,884,439 B2 | 2/2011 | Mazur et al. |
| 7,884,446 B2 | 2/2011 | Mazur et al. |
| 7,897,942 B1 | 3/2011 | Bereket |
| 7,910,964 B2 | 3/2011 | Kawahito et al. |
| 7,923,801 B2 | 4/2011 | Tian et al. |
| 7,968,834 B2 | 6/2011 | Veeder |
| 8,008,205 B2 | 8/2011 | Fukushima et al. |
| 8,013,411 B2 | 9/2011 | Cole |
| 8,030,726 B2 | 10/2011 | Sumi |
| 8,035,343 B2 | 10/2011 | Seman, Jr. |
| 8,058,615 B2 | 11/2011 | McCaffrey |
| 8,076,746 B2 | 12/2011 | McCarten et al. |
| 8,080,467 B2 | 12/2011 | Carey et al. |
| 8,088,219 B2 | 1/2012 | Knerer et al. |
| 8,093,559 B1 | 1/2012 | Rajavel |
| RE43,169 E | 2/2012 | Parker |
| 8,164,126 B2 | 4/2012 | Moon et al. |
| 8,207,051 B2 | 6/2012 | Sickler et al. |
| 8,247,259 B2 | 8/2012 | Grolier et al. |
| 8,259,293 B2 | 9/2012 | Andreou et al. |
| 8,288,702 B2 | 10/2012 | Veeder |
| 8,470,619 B2 | 6/2013 | Bour |
| 8,476,681 B2 | 7/2013 | Haddad et al. |
| 8,564,087 B2 | 10/2013 | Yamamura et al. |
| 8,603,902 B2 | 12/2013 | Mazur et al. |
| 8,629,485 B2 | 1/2014 | Yamamura et al. |
| 8,680,591 B2 | 3/2014 | Haddad et al. |
| 8,742,528 B2 | 6/2014 | Yamamura et al. |
| 8,884,226 B2 | 11/2014 | Miyazaki et al. |
| 8,906,670 B2 | 12/2014 | Gray |
| 8,916,945 B2 | 12/2014 | Sakamoto et al. |
| 8,994,135 B2 | 6/2015 | Yamamura et al. |
| 9,184,204 B2 | 11/2015 | Hu |
| 9,190,551 B2 | 11/2015 | Yamamura et al. |
| 9,209,345 B2 | 12/2015 | Haddad |
| 9,369,641 B2 | 6/2016 | Hu |
| 9,419,159 B2 | 8/2016 | Sakamoto et al. |
| 9,673,250 B2 | 6/2017 | Haddad |
| 2001/0017344 A1 | 8/2001 | Aebi |
| 2001/0022768 A1 | 9/2001 | Takahashi |
| 2001/0044175 A1 | 11/2001 | Barrett et al. |
| 2001/0044266 A1 | 11/2001 | Katsuoka |
| 2002/0020893 A1 | 2/2002 | Lhorte |
| 2002/0024618 A1 | 2/2002 | Imai |
| 2002/0056845 A1 | 5/2002 | Iguchi et al. |
| 2002/0060322 A1 | 5/2002 | Tanabe et al. |
| 2002/0079290 A1 | 6/2002 | Holdermann |
| 2002/0117699 A1 | 8/2002 | Francois |
| 2002/0148964 A1 | 10/2002 | Dausch et al. |
| 2002/0182769 A1 | 12/2002 | Campbell |
| 2003/0029495 A1 | 2/2003 | Mazur et al. |
| 2003/0030083 A1 | 2/2003 | Lee et al. |
| 2003/0045092 A1 | 3/2003 | Shin |
| 2003/0057357 A1 | 3/2003 | Uppal et al. |
| 2003/0111106 A1 | 6/2003 | Nagano et al. |
| 2003/0210332 A1 | 11/2003 | Frame |
| 2003/0213515 A1 | 11/2003 | Sano et al. |
| 2003/0214595 A1 | 11/2003 | Mabuchi |
| 2003/0228883 A1 | 12/2003 | Kusakari et al. |

(56) References Cited

U.S. PATENT DOCUMENTS

| | | |
|---|---|---|
| 2004/0014307 A1 | 1/2004 | Shin et al. |
| 2004/0016886 A1 | 1/2004 | Ringermacher et al. |
| 2004/0041168 A1 | 3/2004 | Hembree et al. |
| 2004/0046224 A1 | 3/2004 | Rossel et al. |
| 2004/0077117 A1 | 4/2004 | Ding et al. |
| 2004/0080638 A1 | 4/2004 | Lee |
| 2004/0130020 A1 | 7/2004 | Kuwabara et al. |
| 2004/0161868 A1 | 8/2004 | Hong |
| 2004/0222187 A1 | 11/2004 | Lin |
| 2004/0252931 A1 | 12/2004 | Belleville et al. |
| 2004/0256561 A1 | 12/2004 | Beuhler et al. |
| 2005/0040440 A1 | 2/2005 | Murakami |
| 2005/0051822 A1 | 3/2005 | Manning |
| 2005/0062041 A1 | 3/2005 | Terakawa et al. |
| 2005/0088634 A1 | 4/2005 | Kosugi |
| 2005/0093100 A1 | 5/2005 | Tze-Chiang et al. |
| 2005/0101100 A1 | 5/2005 | Kretchmer et al. |
| 2005/0101160 A1 | 5/2005 | Garg et al. |
| 2005/0127401 A1 | 6/2005 | Mazur et al. |
| 2005/0134698 A1 | 6/2005 | Schroeder et al. |
| 2005/0150542 A1 | 7/2005 | Madan |
| 2005/0158969 A1 | 7/2005 | Binnis et al. |
| 2005/0211996 A1 | 9/2005 | Krishna et al. |
| 2005/0227390 A1 | 10/2005 | Shtein et al. |
| 2006/0006482 A1 | 1/2006 | Rieve et al. |
| 2006/0011954 A1 | 1/2006 | Ueda et al. |
| 2006/0011955 A1 | 1/2006 | Baggenstoss |
| 2006/0060848 A1 | 3/2006 | Chang et al. |
| 2006/0071254 A1 | 4/2006 | Rhodes |
| 2006/0079062 A1 | 4/2006 | Mazur et al. |
| 2006/0086956 A1 | 4/2006 | Furukawa et al. |
| 2006/0097172 A1 | 5/2006 | Park |
| 2006/0118781 A1 | 6/2006 | Rhodes |
| 2006/0121680 A1 | 6/2006 | Tanaka |
| 2006/0128087 A1 | 6/2006 | Bamji et al. |
| 2006/0132633 A1 | 6/2006 | Nam et al. |
| 2006/0138396 A1 | 6/2006 | Lin et al. |
| 2006/0145148 A1 | 7/2006 | Hirai et al. |
| 2006/0145176 A1 | 7/2006 | Lee |
| 2006/0160343 A1 | 7/2006 | Chong et al. |
| 2006/0166475 A1 | 7/2006 | Mantl |
| 2006/0175529 A1 | 8/2006 | Harmon et al. |
| 2006/0180885 A1 | 8/2006 | Rhodes |
| 2006/0181627 A1 | 8/2006 | Farrier |
| 2006/0210122 A1 | 9/2006 | Cleveland |
| 2006/0214121 A1 | 9/2006 | Schrey et al. |
| 2006/0228897 A1 | 10/2006 | Timans |
| 2006/0231914 A1 | 10/2006 | Carey et al. |
| 2006/0238632 A1 | 10/2006 | Shah |
| 2006/0244090 A1 | 11/2006 | Roy et al. |
| 2006/0255340 A1 | 11/2006 | Manivannan et al. |
| 2006/0257140 A1 | 11/2006 | Seger |
| 2007/0035849 A1 | 2/2007 | Li et al. |
| 2007/0035879 A1 | 2/2007 | Hall et al. |
| 2007/0051876 A1 | 3/2007 | Sumi et al. |
| 2007/0052050 A1 | 3/2007 | Dierickx |
| 2007/0063219 A1 | 3/2007 | Sa'ar et al. |
| 2007/0076481 A1 | 4/2007 | Tennant |
| 2007/0103580 A1 | 5/2007 | Noto |
| 2007/0115554 A1 | 5/2007 | Breitung et al. |
| 2007/0123005 A1 | 5/2007 | Hiura et al. |
| 2007/0125951 A1 | 6/2007 | Snider et al. |
| 2007/0138590 A1 | 6/2007 | Wells et al. |
| 2007/0145505 A1 | 6/2007 | Kim et al. |
| 2007/0178672 A1 | 8/2007 | Tanaka et al. |
| 2007/0187670 A1 | 8/2007 | Hsu et al. |
| 2007/0189583 A1 | 8/2007 | Shimada et al. |
| 2007/0194356 A1 | 8/2007 | Moon et al. |
| 2007/0194401 A1 | 8/2007 | Nagai et al. |
| 2007/0195056 A1 | 8/2007 | Lloyd |
| 2007/0200940 A1 | 8/2007 | Gruhlke et al. |
| 2007/0201859 A1 | 8/2007 | Sarrat |
| 2007/0235827 A1 | 10/2007 | Altice |
| 2007/0237504 A1 | 10/2007 | Nakashiba |
| 2007/0247414 A1 | 10/2007 | Roberts |
| 2007/0262366 A1 | 11/2007 | Baek et al. |
| 2007/0290283 A1 | 12/2007 | Park et al. |
| 2007/0296060 A1 | 12/2007 | Tanabe et al. |
| 2008/0002863 A1 | 1/2008 | Northcott |
| 2008/0020555 A1 | 1/2008 | Shimomura et al. |
| 2008/0026550 A1 | 1/2008 | Werner et al. |
| 2008/0036022 A1 | 2/2008 | Hwang et al. |
| 2008/0044943 A1 | 2/2008 | Mazur et al. |
| 2008/0076240 A1 | 3/2008 | Veschtti et al. |
| 2008/0099804 A1 | 5/2008 | Venezia |
| 2008/0121280 A1 | 5/2008 | Carnel et al. |
| 2008/0121805 A1 | 5/2008 | Tweet et al. |
| 2008/0142686 A1 | 6/2008 | Konno et al. |
| 2008/0158398 A1 | 7/2008 | Yaffe et al. |
| 2008/0170173 A1 | 7/2008 | Park et al. |
| 2008/0173620 A1 | 7/2008 | Grek |
| 2008/0174685 A1 | 7/2008 | Shan et al. |
| 2008/0178932 A1 | 7/2008 | Den Boer et al. |
| 2008/0179762 A1 | 7/2008 | Cho et al. |
| 2008/0191310 A1 | 8/2008 | Wu et al. |
| 2008/0192132 A1 | 8/2008 | Bechtel et al. |
| 2008/0192133 A1 | 8/2008 | Abiru et al. |
| 2008/0196761 A1 | 8/2008 | Nakano et al. |
| 2008/0198251 A1 | 8/2008 | Xu et al. |
| 2008/0202576 A1 | 8/2008 | Hieslmair |
| 2008/0213936 A1 | 9/2008 | Hatai |
| 2008/0223436 A1 | 9/2008 | den Boer et al. |
| 2008/0242005 A1 | 10/2008 | Dozen et al. |
| 2008/0257409 A1 | 10/2008 | Li et al. |
| 2008/0258604 A1 | 10/2008 | Mazur et al. |
| 2008/0266434 A1 | 10/2008 | Sugawa et al. |
| 2008/0266435 A1 | 10/2008 | Agranov et al. |
| 2008/0281174 A1 | 11/2008 | Dietiker |
| 2008/0284884 A1 | 11/2008 | Makino et al. |
| 2008/0309913 A1 | 12/2008 | Fallon |
| 2009/0002528 A1 | 1/2009 | Manabe et al. |
| 2009/0009596 A1 | 1/2009 | Kerr et al. |
| 2009/0014056 A1 | 1/2009 | Hockaday |
| 2009/0027640 A1 | 1/2009 | Shibazaki |
| 2009/0038669 A1 | 2/2009 | Atanackovic |
| 2009/0039397 A1 | 2/2009 | Chao |
| 2009/0050944 A1 | 2/2009 | Hong |
| 2009/0056797 A1 | 3/2009 | Barnett et al. |
| 2009/0057536 A1 | 3/2009 | Hirose |
| 2009/0065051 A1 | 3/2009 | Chan et al. |
| 2009/0078316 A1 | 3/2009 | Khazeni et al. |
| 2009/0095887 A1 | 4/2009 | Saveliev |
| 2009/0097290 A1 | 4/2009 | Chandrasekaran |
| 2009/0101197 A1 | 4/2009 | Morikawa |
| 2009/0109305 A1 | 4/2009 | Dai et al. |
| 2009/0114630 A1 | 5/2009 | Hawryluk |
| 2009/0142879 A1 | 6/2009 | Isaka et al. |
| 2009/0146240 A1 | 6/2009 | Carey, III et al. |
| 2009/0160983 A1 | 6/2009 | Lenchenkov |
| 2009/0174026 A1 | 7/2009 | Carey et al. |
| 2009/0180010 A1 | 7/2009 | Adikisson et al. |
| 2009/0194671 A1 | 8/2009 | Nozaki et al. |
| 2009/0200454 A1 | 8/2009 | Barbier et al. |
| 2009/0200586 A1 | 8/2009 | Mao et al. |
| 2009/0200626 A1 | 8/2009 | Qian et al. |
| 2009/0200631 A1 | 8/2009 | Tai et al. |
| 2009/0206237 A1 | 8/2009 | Shannon et al. |
| 2009/0211627 A1 | 8/2009 | Meier et al. |
| 2009/0213883 A1 | 8/2009 | Mazur et al. |
| 2009/0218493 A1 | 9/2009 | McCaffrey et al. |
| 2009/0223561 A1 | 9/2009 | Kim et al. |
| 2009/0227061 A1 | 9/2009 | Bateman et al. |
| 2009/0242019 A1 | 10/2009 | Ramamoorthy et al. |
| 2009/0242032 A1 | 10/2009 | Yamazaki et al. |
| 2009/0242933 A1 | 10/2009 | Hu et al. |
| 2009/0256156 A1 | 10/2009 | Hsieh |
| 2009/0256226 A1 | 10/2009 | Tatani |
| 2009/0261255 A1 | 10/2009 | Nakamura et al. |
| 2009/0283807 A1 | 11/2009 | Adkisson et al. |
| 2009/0294787 A1 | 12/2009 | Nakaji et al. |
| 2009/0308450 A1 | 12/2009 | Adibi et al. |
| 2009/0308457 A1 | 12/2009 | Smith et al. |
| 2010/0000597 A1 | 1/2010 | Cousins |
| 2010/0013036 A1 | 1/2010 | Carey |

(56) References Cited

U.S. PATENT DOCUMENTS

| | | |
|---|---|---|
| 2010/0013039 A1 | 1/2010 | Qian et al. |
| 2010/0013593 A1 | 1/2010 | Luckhardt |
| 2010/0024871 A1 | 2/2010 | Oh et al. |
| 2010/0032008 A1 | 2/2010 | Adekore |
| 2010/0037952 A1 | 2/2010 | Lin |
| 2010/0038523 A1 | 2/2010 | Venezia et al. |
| 2010/0038542 A1 | 2/2010 | Carey et al. |
| 2010/0040981 A1 | 2/2010 | Kiesel et al. |
| 2010/0044552 A1 | 2/2010 | Chen |
| 2010/0051809 A1 | 3/2010 | Onat et al. |
| 2010/0052088 A1 | 3/2010 | Carey |
| 2010/0053382 A1 | 3/2010 | Kuniba |
| 2010/0055887 A1 | 3/2010 | Piwczyk |
| 2010/0059385 A1 | 3/2010 | Li |
| 2010/0059803 A1 | 3/2010 | Gidon et al. |
| 2010/0072349 A1 | 3/2010 | Veeder |
| 2010/0074396 A1 | 3/2010 | Schmand et al. |
| 2010/0083997 A1 | 4/2010 | Hovel |
| 2010/0084009 A1 | 4/2010 | Carlson et al. |
| 2010/0096718 A1 | 4/2010 | Hynecek et al. |
| 2010/0097609 A1 | 4/2010 | Jaeger et al. |
| 2010/0102206 A1 | 4/2010 | Cazaux et al. |
| 2010/0102366 A1 | 4/2010 | Lee et al. |
| 2010/0109060 A1 | 5/2010 | Mao et al. |
| 2010/0116312 A1 | 5/2010 | Peumans et al. |
| 2010/0117181 A1 | 5/2010 | Kim et al. |
| 2010/0118172 A1 | 5/2010 | McCarten et al. |
| 2010/0128937 A1 | 5/2010 | Yoo et al. |
| 2010/0133635 A1 | 6/2010 | Lee et al. |
| 2010/0140733 A1 | 6/2010 | Lee et al. |
| 2010/0140768 A1 | 6/2010 | Zafiropoulo |
| 2010/0143744 A1 | 6/2010 | Gupta |
| 2010/0147383 A1 | 6/2010 | Carey et al. |
| 2010/0200658 A1 | 8/2010 | Olmstead et al. |
| 2010/0219506 A1 | 9/2010 | Gupta |
| 2010/0224229 A1 | 9/2010 | Pralle et al. |
| 2010/0240169 A1 | 9/2010 | Petti et al. |
| 2010/0245647 A1 | 9/2010 | Honda et al. |
| 2010/0258176 A1 | 10/2010 | Kang et al. |
| 2010/0264473 A1 | 10/2010 | Adkisson et al. |
| 2010/0289885 A1 | 11/2010 | Lu et al. |
| 2010/0290668 A1 | 11/2010 | Friedman et al. |
| 2010/0300505 A1 | 12/2010 | Chen |
| 2010/0300507 A1 | 12/2010 | Heng et al. |
| 2010/0313932 A1 | 12/2010 | Kroll et al. |
| 2011/0003424 A1 | 1/2011 | De Cuester et al. |
| 2011/0019050 A1 | 1/2011 | Yamashita |
| 2011/0056544 A1 | 3/2011 | Ji et al. |
| 2011/0073976 A1 | 3/2011 | Vaillant |
| 2011/0095387 A1 | 4/2011 | Carey et al. |
| 2011/0104850 A1 | 5/2011 | Weidman et al. |
| 2011/0127567 A1 | 6/2011 | Seong |
| 2011/0140221 A1 | 6/2011 | Venezia et al. |
| 2011/0194100 A1 | 8/2011 | Thiel et al. |
| 2011/0220971 A1 | 9/2011 | Haddad |
| 2011/0227138 A1 | 9/2011 | Haddad |
| 2011/0251478 A1 | 10/2011 | Wieczorek |
| 2011/0260059 A1 | 10/2011 | Jiang et al. |
| 2011/0266644 A1 | 11/2011 | Yamamura et al. |
| 2011/0292380 A1 | 12/2011 | Bamji |
| 2011/0303999 A1 | 12/2011 | Sakamoto et al. |
| 2012/0024363 A1 | 2/2012 | Dimer et al. |
| 2012/0024364 A1 | 2/2012 | Carey, III et al. |
| 2012/0038811 A1 | 2/2012 | Ellis-monaghan et al. |
| 2012/0043637 A1 | 2/2012 | King et al. |
| 2012/0049242 A1 | 3/2012 | Atanackovic et al. |
| 2012/0080733 A1 | 4/2012 | Doan et al. |
| 2012/0111396 A1 | 5/2012 | Saylor et al. |
| 2012/0171804 A1 | 7/2012 | Moslehi et al. |
| 2012/0187190 A1 | 7/2012 | Wang et al. |
| 2012/0222396 A1 | 9/2012 | Clemen |
| 2012/0274744 A1 | 11/2012 | Wan |
| 2012/0291859 A1 | 11/2012 | Vineis et al. |
| 2012/0300037 A1 | 11/2012 | Laudo |
| 2012/0305063 A1 | 12/2012 | Moslehi et al. |
| 2012/0312304 A1 | 12/2012 | Lynch et al. |
| 2012/0313204 A1 | 12/2012 | Haddad et al. |
| 2012/0313205 A1 | 12/2012 | Haddad et al. |
| 2012/0326008 A1 | 12/2012 | Mckee et al. |
| 2013/0001553 A1 | 1/2013 | Vineis et al. |
| 2013/0082343 A1 | 4/2013 | Fudaba et al. |
| 2013/0135439 A1* | 5/2013 | Kakuko ............... H04N 13/00 348/46 |
| 2013/0168792 A1 | 7/2013 | Haddad et al. |
| 2013/0168803 A1 | 7/2013 | Haddad et al. |
| 2013/0200251 A1 | 8/2013 | Velichko |
| 2013/0207214 A1 | 8/2013 | Haddad et al. |
| 2013/0285130 A1 | 10/2013 | Ting |
| 2014/0198240 A1* | 7/2014 | Rhoads ............ H01L 27/14625 348/294 |
| 2014/0247378 A1 | 9/2014 | Sharma et al. |
| 2014/0352779 A1 | 12/2014 | Smirnov et al. |
| 2015/0076468 A1 | 3/2015 | Yamaguchi et al. |

FOREIGN PATENT DOCUMENTS

| | | |
|---|---|---|
| DE | 19838439 | 4/2000 |
| EP | 0473439 | 3/1992 |
| EP | 0566156 | 10/1993 |
| EP | 1630871 | 1/2006 |
| EP | 1873840 | 1/2008 |
| EP | 2073270 | 5/2012 |
| EP | 2509107 | 10/2012 |
| FR | 2827707 | 1/2003 |
| GB | 2030766 | 4/1980 |
| JP | S5771188 | 5/1982 |
| JP | S57173966 | 10/1982 |
| JP | S63116421 | 5/1988 |
| JP | H02152226 | 6/1990 |
| JP | H02237026 | 9/1990 |
| JP | H03183037 | 8/1991 |
| JP | H04318970 | 11/1992 |
| JP | H06104414 | 4/1994 |
| JP | H06267868 | 9/1994 |
| JP | H06275641 | 9/1994 |
| JP | H07235658 | 5/1995 |
| JP | H07183484 | 7/1995 |
| JP | 9148594 | 6/1997 |
| JP | H09298308 | 11/1997 |
| JP | 11077348 | 3/1999 |
| JP | 11097724 | 4/1999 |
| JP | 2000164914 | 6/2000 |
| JP | 2001007381 | 1/2001 |
| JP | 2001024936 | 1/2001 |
| JP | 2001189478 | 7/2001 |
| JP | 2001257927 | 9/2001 |
| JP | 2001339057 | 12/2001 |
| JP | 2002043594 | 2/2002 |
| JP | 2002134640 | 5/2002 |
| JP | 2003163360 | 6/2003 |
| JP | 2003242125 | 8/2003 |
| JP | 2003258285 | 9/2003 |
| JP | 2003308130 | 10/2003 |
| JP | 2004047682 | 2/2004 |
| JP | 2004273886 | 9/2004 |
| JP | 2004273887 | 9/2004 |
| JP | 2005339425 | 12/2005 |
| JP | 2006033493 | 2/2006 |
| JP | 2006147991 | 6/2006 |
| JP | 2006173381 | 6/2006 |
| JP | 2006210701 | 8/2006 |
| JP | 2006255430 | 9/2006 |
| JP | 2006261372 | 9/2006 |
| JP | 2007165909 | 6/2007 |
| JP | 2007180642 | 7/2007 |
| JP | 2007180643 | 7/2007 |
| JP | 2007305675 | 11/2007 |
| JP | 2008187003 | 8/2008 |
| JP | 2008283219 | 11/2008 |
| JP | 2009021479 | 1/2009 |
| JP | 2009152569 | 7/2009 |
| JP | 2010278472 | 12/2010 |
| JP | 2011091128 | 5/2011 |
| KR | 20010061058 | 4/2001 |

(56) References Cited

FOREIGN PATENT DOCUMENTS

| | | |
|---|---|---|
| KR | 2005039273 | 4/2005 |
| KR | 100825808 | 4/2008 |
| KR | 20090077274 | 7/2009 |
| KR | 20100118864 | 11/2010 |
| KR | 20060052278 | 5/2016 |
| TW | 200627675 | 8/2006 |
| TW | 200818529 | 4/2008 |
| WO | WO 91/14284 | 9/1991 |
| WO | 200031967 | 6/2000 |
| WO | WO 2002041363 | 5/2002 |
| WO | WO 03/059390 | 7/2003 |
| WO | WO 03/105821 | 12/2003 |
| WO | WO 2006/086014 | 8/2006 |
| WO | WO 2008091242 | 7/2008 |
| WO | 2008099524 | 8/2008 |
| WO | WO 2008099524 | 8/2008 |
| WO | WO 2008145097 | 12/2008 |
| WO | 2009016846 | 2/2009 |
| WO | WO 2009100023 | 8/2009 |
| WO | 2009147085 | 12/2009 |
| WO | WO 2009147085 | 12/2009 |
| WO | WO 2010033127 | 3/2010 |
| WO | 2011003871 | 1/2011 |
| WO | WO 2011003871 | 1/2011 |
| WO | 2011119618 | 3/2011 |
| WO | WO 2011035188 | 3/2011 |
| WO | WO 2011119618 | 3/2011 |
| WO | 2012174752 | 12/2012 |

OTHER PUBLICATIONS

International Preliminary Report on Patentability and Written Opinion, dated Aug. 18, 2014, in corresponding PCT/US2014/0024964 (6 pages).

A. Arndt, J.F. Allison, J.G. Haynos, and A. Meulenberg, Jr., "Optical Properties of the COMSAT Non-reflective Cell," 11th IEEE Photovoltaic Spec. Conf., p. 40, 1975.

Asom et al., Interstitial Defect Reactions in Silicon; Appl. Phys. Lett.; Jul. 27, 1987; pp. 256-258; vol. 51(4); American Institute of Physics.

Berger, Michael; Moth Eyes Inspire Self-Cleaning Antireflection Nanotechnology Coatings; 2008; 3 pages; Nanowerk LLC.

Berger, O., Inns, D. and Aberle, A.E. "Commercial White Paint as Back Surface Reflector for Thin-Film Solar Cells", Solar Energy Materials & Solar Cells, vol. 91, pp. 1215-1221,2007.

Betta et al.; Si-PIN X-Ray Detector Technology; Nuclear Instruments and Methods in Physics Research; 1997; pp. 344-348; vol. A, No. 395; Elsevier Science B.V.

Boden, S.A. et al.; Nanoimprinting for Antireflective Moth-Eye Surfaces; 4 pages; 2008.

Bogue: "From bolometers to beetles: the development of the thermal imaging sensors;" sensor Review; 2007; pp. 278-281; Emerald Group Publishing Limited (ISSN 0260-2288).

Borghesi et al.; "Oxygen Precipitation in Silicon," J. Appl. Phys., v. 77(9), pp. 4169-4244 (May 1, 1995).

Born, M. and E.Wolf, "Princip les of Optics, 7th Ed.", Cambridge University Press, 1999, pp. 246-255.

Brieger,S., O.Dubbers, S.Fricker, A.Manzke, C.Pfahler, A.Plettl, and P.Zlemann, "An Approach for the Fabrication of Hexagonally Ordered Arrays of Cylindrical Nanoholes in Crystalline and Amorphous Silicon Based on the Self-Organization of Polymer Micelles", Nanotechnology, vol. 17, pp. 4991-4994, 2006, doi:10.1088/0957-4884/17/19/036.

Buttgen, B.; "Demodulation Pixel Based on Static Drift Fields"; IEEE Transactions on Electron Devices, vol. 53, No. 11, Nov. 2006.

Carey et al., "Femtosecond-Laser-Assisted Microstructuring of Silicon Surfaces", Optics and Photonics News, 2003. 14, 32-36.

Carey, et al. "Femtosecond Laser-Assisted Microstructuring of Silicon for Novel Detector, Sensing and Display Technologies", LEOS 2003, 481-482, Tuscon, AR.

Carey, et al. "Femtosecond Laser-Assisted Microstructuring of Silicon for Novel Detector, Sensing and Display Technologies", LEOS; 2002, 97-98, Glasgos, Scotland, 2002.

Carey, et al., "Fabrication of Micrometer-Sized Conical Field Emitters Using Femtosecond Laser-Assisted Etching of Silicon," Proc. IVMC 2001, 75-76, UC Davis, Davis, CA.

Carey, et al., "Field Emission from Silicon. Microstructures Formed by Femtosecond Laser Assisted Etching," Proc. CLEO 2001 (Baltimore, MD 2001) 555-557.

Carey, et al., "High Sensitivity Silicon-Based VIS/NIR Photodetectors", Optical Society of America (2003) 1-2.

Carey, III; "Femtosecond-laser Microstructuring of Silicon for Novel Optoelectronic Devices"; Harvard University, Jul. 2004; (Thesis).

Chang, S.W., V.P.Chuang, S.T.Boles, and C.V.Thompson, "Metal-Catalyzed Etching of Vertically Aligned Polysilicon and Amorphous Silicon Nanowire Arrays by Etching Direction Confinement", Advanced Functional Materials, vol. 20, No. 24, pp. 4364-4370, 2010.

Chen, Q. et al.; Broadband moth-eye antireflection coatings fabricated by low-cost nanoimprinting; Applied Physics Letters 94; pp. 263118-1-263118-3; 2009; American Institute of Physics.

Chien et al, "Pulse Width Effect in Ultrafast Laser Processing of Materials," Applied Physics A, 2005, 1257-1263, 81, Springer Berlin, Heidelberg, Germany.

Chiang, Wen Jen Et al., "Silicon Nanocrystal-Based Photosensor on Low-Temperature Polycrystalline-Silicone Panels", Applied Physics Letters, 2007, 51120-1-51120-3, Ltt. 91, American Inst. of Physics, Melville, NY.

Chichkiv, B.N. et al, "Femtosecond, picosecond and nanosecond laser ablation of solids" Appl. Phys. A 63, 109-115; 1996.

Cilingiroglu et al., "An evaluation of MOS Interface-Trap Charge Pump as and Ultralow Constant-Current Generator," IEEE Journal of Solid-State Circuit, 2003, vol. 38, No. 1, Jan. 2003, 71-83.

CMOSIS; "Global Shutter Image Sensors for Machine Vision Application"; Image Sensors Europe 2010, Mar. 23-25, 2010; .COPYRGT. copyright 2010.

Cotter, Jeffrey E.; Optical intensity of light in layers of silicon with rear diffuse reflectors; Journal of Applied Physics; Jul. 1, 1998; pp. 618-624; vol. 84, No. 1; American Institute of Physics.

Crouch et al., "Comparison of Structure and Properties of Femtosecond and Nanosecond Laser-Structured Silicon" Appl. Phys. Lett., 2004, 84, 1850-1852.

Crouch et al., "Infrared Absorption by Sulfur-Doped Silicon Formed by Femtosecond Laser Irradiation", Appl. Phys. A, 2004, 79, 1635-1641.

Despeisse, et al.; "Thin Film Silicon Solar Cell on Highly Textured Substrates for High Conversion Efficiency"; 2004.

Detection of X-ray and Gamma-ray Photons Using Silicon Diodes; Dec. 2000; Detection Technology, Inc.; Micropolis, Finland.

Dewan, Rahul et al.; Light Trapping in Thin-Film Silicon Solar Cells with Submicron Surface Texture; Optics Express; vol. 17, No. 25; Dec. 7, 2009; Optical Society of America.

Deych et al.; Advances in Computed Tomography and Digital Mammography; Power Point; Nov. 18, 2008; Analogic Corp.; Peabody, MA.

Dobie, et al.; "Minimization of reflected light in photovoltaic modules"; Mar. 1, 2009.

Dobrzanski, L.A. et al.; Laser Surface Treatment of Multicrystalline Silicon for Enhancing Optical Properties; Journal of Materials Processing Technology; p. 291-296; 2007; Elsevier B.V.

Dolgaev et al., "Formation of Conical Microstructures Upon Laser Evaporation of Solids", Appl. Phys. A, 2001, 73, 177-181.

Duerinckx, et al.; "Optical Path Length Enhancement for >13% Screenprinted Thin Film Silicon Solar Cells"; 2006.

Dulinski, Wojciech et al.; Tests of backside illumincated monolithic CMOS pixel sensor in an HPD set-up; Nuclear Instruments and methods in Physics Research; Apr. 19, 2005; pp. 274-280; Elsevier B.V.

Forbes; "Texturing, reflectivity, diffuse scattering and light trapping in silicon solar cells"; 2012.

(56) References Cited

OTHER PUBLICATIONS

Forbes, L. and M.Y. Louie, "Backside Nanoscale Texturing to Improve IR Response of Silicon Photodetectors and Solar Cells," Nanotech, vol. 2, pp. 9-12, Jun. 2010.
Fowlkes et al., "Surface Microstructuring and Long-Range Ordering of Silicon Nanoparticles", Appl. Phys. Lett., 2002, 80 (20), 3799-3801.
Gjessing, J. et al.; 2D back-side diffraction grating for impored light trapping in thin silicon solar cells; Optics Express; vol. 18, No. 6; pp. 5481-5495; Mar. 15, 2010; Optical Society of America.
Gjessing, J. et al.; 2D blazed grating for light trapping in thin silicon solar cells; 3 pages; 2010; Optical Society of America.
Gloeckler et al. Band-Gap Grading in CU(In,GA)Se2 Solar Cells, Journal of Physics and Chemistry of Solids; 2005; pp. 189-194; vol. 66.
Goetzberger, et al.; "Solar Energy Materials & Solar Cells"; vol. 92 (2008) pp. 1570-1578.
Han et al., "Evaluation of a Small Negative Transfer Gate Bias on the Performance of 4T CMOS Image Sensor Pixels," 2007 International Image Sensor Workshop, 238-240, Ogunquit, Maine.
Haug, et al.; "Light Trapping effects in thin film silicon solar cells"; 2009.
Her et al., "Microstructuring of Silicon with Femtosecond Laser Pulses," Applied Physics Letters, 1998, 1673-1675, vol. 73, No. 12, American Institute of Physics.
Her et al., "Novel Conical Microstructures Created in Silicon With Femtosecond Laser Pulses", CLEO 1998, 511-512, San Francisco, CA.
Her, et al., "Femtosecond laser-induced formation of spikes on silicon," Applied Physics A, 2000, 70, 383-385.
Hermann, S. et al.; Impact of Surface Topography and Laser Pulse Duration for Laser Ablation of Solar Cell Front Side Passivating SiNx Layers; Journal of Applied Physics; vol. 108, No. 11; pp. 114514-1-114514-8; 2010; American Institute of Physics.
High-Performance Technologies for Advanced Biomedical Applications; .COPYRGT. 2004Brochure; pp. 1-46; PerkinElmerOptoelectronics.
Holland; Fabrication of Detectors and Transistors on High-Resistivity Silicon; Nuclear Instruments and Methods in Physics Research, vol. A275, pp. 537-541 (1989).
Hong et al., "Cryogenic processed metal-semiconductor-metal (MSM) photodetectors on MBE grown ZnSe,", 1999, IEEE Transactions on Electron Devices, vol. 46, No. 6, pp. 1127-1134.
Hsieh et al., "Focal-Plane-Arrays and CMOS Readout Techniques of Infrared Imaging Systems," IEE Transactions on Circuits and Systems for Video Technology, 1997, vol. 7, No. 4, Aug. 1997, 594-605.
Hu et al., "Solar Cells from Basic to Advanced Systems," McGraw Hill Book Co., 1983, 39, New York, New York.
Huang, et al.; "Microstructured silicon photodetector"; Applied Physics Letters 89, 033506; 2006 American Institute of Physics; 2006.
Hüpkes, J. et al.; Light Scattering and Trapping in Different Thin Film Photovoltaic Devices; 24th European Photovoltaic Solar Energy Conference, Hamburg, Germany (Sep. 21-25, 2009); pp. 2766-2769.
Igalson et al. Defect States in the CIGS Solar cells by Photocapacitance and Deep Level Optical Spectroscopy; Bulletin of the Polish Academy of Sciences Technical Sciences; 2005; pp. 157-161; vol. 53(2).
"Infrared Absorption by Sulfur-Doped Silicon formed by Femtosecond Laser Irradiation"; Springer Berline/Heidelberg, vol. 79, Nov. 2004.
Job et al., "Doping of Oxidized Float Zone Silincon by Thermal Donors—A low Thermal Budget Doping Method for Device Applications?" Mat. Res. Soc. Symp. Pro.; v. 719, F9.5.1-F9.5.6 (2002).
Joy, T. et al.; Development of a Production-Ready, Back-Illuminated CMOS Image Sensor with Small Pixels; Electron Devices Meeting; pp. 1007-1010; 2007; IEEE.
Juntunen et al.; Advanced Photodiode Detector for Medical CT Imaging: Design and Performance; 2007; pp. 2730-2735; IEEE.
Kim et al.; "Strong Sub-Band-Gap Infrared Absorption in Silicon Supersaturated with Sulfur"; 2006 Appl. Phys. Lett. 88, 241902-1-241902-3.
Kolasinski et al., "Laser Assisted and Wet Chemical Etching of Silicon Nanostructures," J. Vac. Sci. Technol., A 24(4), Jul./Aug. 2006, 1474-1479.
Konstantatos et al., "Engineering the Temproal Response of Photoconductive Photodetectors via Selective Introduction of Surface Trap States," Nano Letters, v. 8(5), pp. 1446-1450 (Apr. 2, 2008).
Konstantatos et al., "PbS Colloidal Quantum Dot Photoconductive Photodetectors: Transport, Traps, and Gain," Appl. Phys. Lett., v. 91, pp. 173505-1-173505-3 (Oct. 23, 2007).
Kray, D. et al.; Laser-doped Silicon Soalr Cells by Laser Chemical Processing (LCP) exceeding 20% Efficiency; 33rd IEEE Photovoltaic Specialist Conference; 3 pages; May 2008; IEEE.
Kroning et al.; X-ray Imaging Systems for NDT and General Applications; 2002; Fraunhofer Institute for Nondestructive Testing; Saarbrucken and Dresden, Germany.
Kryski; A High Speed 4 Megapixel Digital CMOS Sensor; 2007 International Image Sensor Workshop; Jun. 6-10, 2007.
Li, "Design and Simulation of an Uncooled Double-Cantilever Microbolometer with the Potential for .about.mK NETD," 2004, Sensors and Actuators A, 351-359, vol. 112, Elsevier B.V.
Li et al., "Gettering in High Resistive Float Zone Silicon Wafers," Transaction on Nuclear Science, vol. 36(1), pp. 290-294 (Feb. 1, 1989).
Li, Hongsong et al.; An experimental study of the correlation between surface roughness and light scattering for rough metallic surfaces; Advanced Characterization Techniques for Optics, Semiconductors, and Nanotechnologies II; 2005; pp. 25780V-1-25780V-15; vol. 5878; SPIE Bellingham, WA.
Lin, A. et al.; Optimization of Random Diffraction Gratings in Thin-Film Solar Cells Using Genetic Algorithms; 2007; 1 page; SSEL Annual Report.
Low Dose Technologies; Power Point.
Madzharov, et al.; "Light trapping in thin-firm silicon solar cells for superstrate and substrate configuration" Abstract #1614, 218.sup.th ECS Meeting .COPYRGT. 2010 the Electrochemical Society.
"Masimo Rainbow SET Pulse Co-Oximetry," 2010, Masimo Corporation, Irvine, California, http://www.masimo.com/Rainbow/about.htm.
Mateus; C.F.R. et al.; Ultrabroadband Mirror Using Low-Index Cladded Subwavelength Grating; Photonics Technology Letters; vol. 16, Issue No. 2; pp. 518-520; Feb. 2004; IEEE.
Matsuno, Shigeru et al.; Advanced Technologies for High Efficiency Photovoltaic Systems; Mitsubishi Electric Advance; vol. 122; pp. 17-19; Jun. 2008.
Meynants, et al.; "Backside illuminated global shutter COMOS image sensors"; 2011 International Image Sensor Workshop; Jun. 11, 2011.
Moloney, A.M. et al.; Novel Black Silicon PIN Photodiodes; 8 pages; Jan. 25, 2006; SPIE.
Moon et al. Selective emitter using porous silicon for crystalline silicon solar cells. Solar Energy Materials & Solar Cells, v. 93, pp. 846-850 (2009).
Moses; Nuclear Medical Imaging—Techniques and Challenges; Power Point; Feb. 9, 2005; Lawrence Berkeley National Laboratory Department of Functional Imaging.
Murkin, JM and Arangol, M, "Near Infrared spectroscopy as an index of rain and tissue oxygenation," Bri. J. of Anathesia (BJA/PPA Supplement):13-il3 (2009).
Munday, J.N. et al.; Large Integrated Absorption Enhancement in Plasmonic Solar Cells by Combining Metallic Gratings and Antireflection Coatings; Nano Letters; vol. 11, No. 6; pp. 2195-2201; Oct. 14, 2010; American Chemical Society.
Myers, Richard et al., "Enhancing Near-IR Avalanche Photodiodes Performance by Femtosecond Laser Microstructuring" Harvard Dept. of Physics.
Nauka et al., Intrinsic Gettering in Oxygen-Free Silicon; App. Phys. Lett., vol. 46(7), Apr. 4, 1985.

(56) References Cited

OTHER PUBLICATIONS

Nauka et al., "New Intrinsic Gettering Process in Silicon Based on Interactions of Silicon Interstitials," J. App. Phys., vol. 60(2), pp. 615-621, Jul. 15, 1986.
Nayak et al, "Semiconductor Laesr Crystallization of a—Si:H," SPIE Digital Library, 2003, 277-380, vol. 4977, Bellingham, Washington. 2003.
Nayak et al, "Ultrafast-Laser-Assisted Chemical Restructuring of Silicon and Germanium Surfaces," Applied Surface Science, 2007, 6580-6583, vol. 253, Issue 15, Elsevier B.V.
Nayak et al, "Semiconductor Laser Crystallization of a—Si:H on Conducting Tin-Oxide-Coated Glass for Solar Cell and Display Applications," Applied Physics A, 2005, 1077-1080, 80, Springer Berlin, Heidelberg, Germany.
Nayak, B.K. et al.; Ultrafast Laser Textured Silicon Solar Cells; Mater. Res. Soc. Symp. Proc.; vol. 1123; 6 pages; 2009; Materials Research Society.
Nayak, et al.; "Efficient light trapping in silicon solar cells by ultrafast-laser-induced self-assembled micro/nano structures"; Progress in Photovoltaics: Research and Applications; 2011.
Oden, et al.; "Optical and Infrared Detection Using Microcantilevers;" SPIE Digital Library on Oct. 13, 2010; vol. 2744; 10 pages.
Pain, Bedabrata; Backside Illumination Technology for SOI-CMOS Image Sensors; 2009 IISW Symposium on Backside Illujination of Solid-State Image Sensors, Bergen Norway; Jun. 25, 2009; pp. 1-23.
Pain, Bedabrata; "A Back-Illuminated Megapixel CMOS Image Sensor"; http://hdl.handle.net/2014/39312; May 1, 2005.
Palm et al. CIGSSe Thin Film PB Modules: From Fundamental Investigators to Advanced Performance and Stability; Thin Solid Films; 2004; pp. 544-551; vol. 451-2.
Payne, D.N.R. et al.; Characterization of Experimental Textured ZnO:Al Films for Thin Film Solar Cell Applications and Comparison with Commercial and Plasmonic Alternatives; Photovoltaic Specialists Conference (PVSC); pp. 1560-1564; 2010; IEEE.
Pedraza et al., "Silicon Microcolumn Arrays Grown by Nanosecond Pulsed-Excimer Laser Irradiation", Appl. Phys. Lett., 1999, 74 (16), 2322-2324, American Institute of Physics.
Pedraza et al., "Surface Nanostructuring of Silicon", Appl. Phys. A, 2003, 77, 277-284.
Rashkeev et al., "Hydrogen passivation and Activation of Oxygen Complexes in Silicon," American Institute of Physics, vol. 78(11), pp. 1571-1573 (Mar. 12, 2001).
Russell, et al.; "Nanosecond Eximer Laser Processing for Novel Microelectronic Fabrication"; Nanosecond Excimer Laser Processing; 6 pages; 1989.
Russell, Ramirez and Kelley, "Nanosecond Excimer Laser Processing for Novel Microelectronic Devices," US Navy, SPAWAR, San Diego, Techical Report, 2003.
Russell, Ramirez, Kelley, "Nanosecond Excimer Laser Processing for Novel Microelectronic Fabrication," SSC Pacific Technical Reports , pp. 228-233, 2003, vol. 4, US Navy.
Sai, H. et al.; Enhancement of Light Trapping in Thin-Film Hydrogenated Microcrystalline Si Solar Cells Using Back Reflectors with Self-Ordered Dimple Pattern; Applied Physics Letters; vol. 93; 2008; American Institute of Physics.
Sanchez et al., "Whiskerlike Structure Growth on Silicon Exposed to ArF Excimer Laser Irradiation", Appl. Phys. Lett., 1996, 69 (5), 620-622.
Sanchez et al., "Dynamics of the Hydrodynamical Growth of Columns on Silicon Exposed to ArF Excimer-Laser Irradiation", Appl. Phys. A, 66, 83-86 (1998).
Sarnet et al.; "Femtosecond laser for black silicon and photovoltaic cells"; Feb. 21, 2008, Proc. of SPIE; vol. 6881; pp. 1-15.
Senoussaoui, N. et al.; Thin-Film Solar Cells with Periodic Grating Coupler; Thin Solid Films; pp. 397-401; 2003; Elsevier B.V.
Serpenguzel et al., "Temperature Dependence of Photluminescence in Non-Crystalline Silicon", Photonics West (San Jose, CA, 2004) 454-462.
Shen et al., "Formation of Regular Arrays of Silicon Micorspikes by Femotsecond Laser Irradiation Through a Mask", Appl. Phys. Lett., 82, 1715-1717 (2003).
Solar Energy Research Institute, "Basic Photovoltaic Principles and Methods," Van Nostrand Reinhold Co., NY 1984, pp. 45-47 and 138-142.
Solhusvik, J. et al. "A 1280×960 3.75um pixel CMOS imager with Triple Exposure HDR," Proc. of 2009 International Image Sensor Workshop, Bergen, Norway, Jun. 22-28, 2009.
Stone et al.; The X-ray Sensitivity of Amorphous Selenium for Mammography;.Am. Assoc. Phys. Med.; Mar. 2002; pp. 319-324; vol. 29 No. 3; Am. Assoc. Phys. Med.
Szlufcik, J. et al.; Simple Integral Screenprinting process for selective emitter polycrystalline silicon solar cells; Applied Physics Letters; vol. 59, No. 13; Sep. 23, 1991; American Institute of Physics.
Tabbal et al., "Formation of Single Crystal Sulfur Supersaturated Silicon Based Junctions by Pulsed Laser Melting". 2007, J. Vac. Sci. Technol. B25(6), 1847-1852.
Takayanagi, et al.; "A 600.times.600 Pixel, 500, fps CMOS Image Sensor with a 4.4 jum Pinned Photodiode 5-Transistor Global Shutter Pixel"; 2007 International Image Sensor Workshop; Jun. 6-10, 2007.
Tower, John R. et al.; Large Format Backside Illuminated CCD Imager for Space Surveillance; IEEE Transactions on Electron Devices, vol. 50, No. 1; Jan. 2003; pp. 218-224.
Tull; "Femtosecond Laser Ablation of Silicon: Nanoparticles, Doping and Photovotaics"; Harvard University, Jun. 2007 (Thesis).
Uehara et al., "A High-Sensitive Digital Photosensor Using MOS Interface-Trap Charge Pumping," IEICE Electronics Express, 2004, vol. 1, No. 18, 556-561.
Wilson, "Depth Distributions of Sulfur Implanted Into Silicon as a Function of Ion energy, Ion Fluence, and Anneal Temperature," 1984, Appl. Phys. 55(10, 3490-3494.
Winderbaum, S. et al.; Reactive ion etching (RIE) as a method for texturing polycrystalline silicon solar cells; Solar Energy Materials and Solar Cells; 1997; pp. 239-248; Elsevier Science B.V.
Wu et al., "Black Silicon" Harvard UPS 1999.
Wu et al., "Black Silicon: A New Light Absorber," APS Centennial Meeting (Mar. 23, 1999).
Wu et al., "Femtosecond laser-gas-solid interactions," Thesis presented to the Department of Physics at Harvard University, pp. 1-113, 126-136, Aug. 2000.
Wu et al., "Visible Luminescence From Silicon Surfaces Microstructured in Air". Appl. Phys. Lett., vol. 81, No. 11, 1999-2001 (2002).
Wu, et al "Near-Unity Below-Band-Gap Absorption by Microstructured Silicon," 2001, Applied Physics Letters, 1850-1852, vol. 78, No. 13, American Institute of Physics.
Xu, Y., et al., "Infrared Detection Using Thermally Isolated Diode," Sensors and Actuators A, Elsevier Sequoia S.A., 1993, vol. 36, 209-217, Lausanne, Switzerland.
Yablonovitch, et al.; "Intensity Enhancement in Textured Optical Sheets for Solar Cells"; .COPYRGT. 1982 IEEE.
Yamamoto, K. et al.; NIR Sensitivity Enhancement by Laser Treatment for Si Detectors; Nuclear Instruments and Methods in Physics Research A; pp. 520-523; Mar. 31, 2010; Elsevier.
Yan, B.; Light Trapping Effect from Randomized Textures of Ag/ZnO Back Reflector on Hyrdrogenated Amorphous and Nanocrystalline Silicon Based Solar Cells; Thin Film Solar Technology II; vol. 7771; 2010; SPIE.
Yasutomi, et al.; "Two-Stage Charge Transfer Pixel Using Pinned Diodes for Low-Noise Global Shutter Imaging"; 2009 International Image Sensor Workshop; Mar. 28, 2009.
Younkin et al., "Infrared Absorption by Conical Silicon Microstructures Made in a Variety of Background Gases Using Femtosecond-Laser Pulses", J. Appl. Phys., 93, 2626-2629 (2003).
Younkin, "Surface Studies and Microstructure Fabrication Using Femtosecond Laser Pulses," Thesis presented to the Division of Engineering & Applied sciences at Harvard University (Aug. 2001).
Yuan, et al.; "Efficient black silicon solar cell with a density-graded nanoporous surface: Optical properties, performance limitations,

(56) References Cited

OTHER PUBLICATIONS and design rules"; American Institute of Physics; Applied Physics Letters 95. 1230501 (2009) 3 pages.

Zaidi, S.H. et al.; Diffraction Grating Structures in Solar Cells; Photovoltaic Specialists Conference, 2000; 4 pages; Sep. 2000; IEEE.

Zhang et al, "Ultra-Shallow P+-Junction Formation in Silicon by Excimer Laser Doping: a Heat and Mass Transfer Perspective," Int. J. Heat Mass Transfer, 1996, 3835-3844, vol. 39, No. 18, Elsevier Science Ltd., Great Britain.

Zhu et al., "Evolution of Silicon Surface Microstructures by Picosecond and Femtosecond Laser Irradiations," Applied Surface Science, 2005, 102-108, Elsevie, Amsterdam, NL.Ultra-Shallow P+-Junction Formation in Silicon by Excimer Laser Doping: a Heat and Mass Transfer Perspective, Int. J. Heat Mass Transfer, 1996, 3835-3844, vol. 39, No. 18, Elsevier Science Ltd., Great Britain.

Bernhard, C.G., "Structural and Functional Adaptation in a Visual System" Endevor vol. 26, pp. 79-84, May 1967.

Clapham, P.B. et al, "Reduction of Lens Reflexion by the Moth Eye Principle" Nature, vol. 244. Aug. 1973, pp. 281-282.

Huang, et al.; "Key Technique for texturing a uniform pyramid structure with a layer of silicon nitride on monocrystalline silicon wafer" Applied Surface Science; 2013 pp. 245-249.

Jansen, H. et al., "The Black Silicon Method: a universal method for determining the parameter setting of a flourine-based reactive ion etcher in deep silicon trench etching with profile control",J. Micromech. Microeng. vol. 5, 1995 pp. 115-120.

Koh et al., "Simple nanostructuring on silicon surface by means of focused beam patterning and wet etching", Applied Surface Science, 2000 pp. 599-603.

Zhong, S. et al. "Excellent Light Trapping in Ultrathin Solar Cells," AFM-Journal, May 2016 pp. 1-11.

Campbell, Stephen A., "The Science and Engineering of Microeletronic Fabrication, 2nd Ed.", Oxford University Press, 2001, pp. 406-411.

Carey, P.G. et al., "In-situ Doping of Silicon Using Gas Immersion Laser Doping (GILD) Process," Appl. Surf. Sci. 43, 325-332 (1989).

Gibbons, J., "Ion Implantation in Semiconductors—Part II; Damage Production and Annealing", proceedings of the IEEE vol. 60, No. 9 pp. 1062-1096. Jun. 1972.

Ohring, Milton."The Materials of Science of Thin Films"; pp. 176-179; Academic Press, 1992.

Ziou et al., "Depth from defocus using the hermite transform", Image Processing, 1998. ICIP 98. Intl. Conference on Chicago, IL. Oct. 1998 pp. 958-962.

\* cited by examiner

THREE DIMENSIONAL IMAGING UTILIZING STACKED IMAGER DEVICES AND ASSOCIATED METHODS

PRIORITY DATA

This application claims the benefit of U.S. Provisional Patent Application Ser. No. 61/798,805, filed on Mar. 15, 2013, which is incorporated herein by reference.

BACKGROUND

Active pixel sensors (APS) are image sensors including integrated circuit containing an array of pixel sensors, each pixel containing a photodetector and an active amplifier. Such an image sensor is typically produced by a complementary metal-oxide-semiconductor (CMOS) process. CMOS APS can be used in web cams, high speed and motion capture cameras, digital radiography, endoscopy cameras, DSLRs, cell phone cameras, and the like. Other advances in image sensor technology have been implemented, such as the use of an intra-pixel charge transfer along with an in-pixel amplifier to achieve true correlated double sampling (CDS) and low temporal noise operation, and on-chip circuits for fixed-pattern noise reduction.

Some CMOS APS imagers have utilized backside illuminated (BSI) technology. BSI imager technology includes a semiconductor wafer bonded to a permanent carrier on the front side and then thinned from the backside. Passivation layers, anti-reflecting layers, color filters and micro-lens can be positioned on the backside, and the resulting device can be backside illuminated. Through-Silicon Vias (TSV) can be used to provide electrical connections from the front side to backside output pads. BSI CMOS APS imagers are becoming useful technology for many types of visible imagers in cell phones and digital cameras.

More generally, electromagnetic radiation can be present across a broad wavelength range, including visible range wavelengths (approximately 350 nm to 800 nm) and non-visible wavelengths (longer than about 800 nm or shorter than 350 nm). The infrared spectrum is often described as including a near infrared portion of the spectrum including wavelengths of approximately 800 to 1300 nm, a short wave infrared portion of the spectrum including wavelengths of approximately 1300 nm to 3 micrometers, and a mid to long range wave infrared (or thermal infrared) portion of the spectrum including wavelengths greater than about 3 micrometers up to about 20 micrometers. These are generally and collectively referred to herein as infrared portions of the electromagnetic spectrum unless otherwise noted.

Traditional silicon photodetecting imagers have limited light absorption/detection properties. For example, such silicon based detectors are mostly transparent to infrared light. While other mostly opaque materials (e.g. InGaAs) can be used to detect infrared electromagnetic radiation having wavelengths greater that about 1000 nm, silicon is still commonly used because it is relatively cheap to manufacture and can be used to detect wavelengths in the visible spectrum (i.e. visible light, 350 nm-800 nm). Traditional silicon materials require substantial path lengths and absorption depths to detect photons having wavelengths longer than approximately 700 nm. While visible light can be absorbed at relatively shallow depths in silicon, absorption of longer wavelengths (e.g. 900 nm) in silicon of a standard wafer depth (e.g. approximately 750 µm) is poor if at all.

SUMMARY

The present disclosure provides various systems and devices having a unique architecture that can determine distance and generate three dimensional representations of a subject, including associated methods thereof. In one aspect, for example, an imaging system capable of deriving three dimensional information from a three dimensional subject is provided. Such a system can include a first imager array having a first light incident surface and a second imager array having a second light incident surface. The second imager array can be coupled to the first imager array at a surface that is opposite the first light incident surface, with the second light incident surface being oriented toward the first imager array and at least substantially uniformly spaced at a distance of from about 2 microns to about 150 microns from the first light incident surface. The system can also include a system lens positioned to direct incident light along an optical pathway onto the first light incident surface of the first imager. The first imager array is operable to detect a first portion of the light passing along the optical pathway and to pass through a second portion of the light, where the second imager array is operable to detect at least a part of the second portion of light. In one aspect, the first imager and the second imager are detecting and comparing light having substantially the same wavelength in order to calculate distance to a subject or to generate a three dimensional representation of the subject. Regarding the frequencies of light that can be utilized by the present imager arrays, the first portion of light and the second portion of light can have at least one wavelength of from about 500 nm to about 1100 nm. In another aspect, the first portion of light and the second portion of light can have at least one wavelength of from about 750 nm to about 1100 nm. Additionally, in some aspects such a system can further include an active light emitter configured to emit active light radiation at least substantially toward the three dimensional subject, where the active light radiation has a center wavelength of from about 750 nm to about 1100 nm. In another aspect, the active light radiation has a center frequency of 850 nm, 940 nm, or 1064 nm.

In another aspect, the system can also include a computation module operable to calculate distance data from the imaging system to the three dimensional subject using first image data collected by the first imager array from the first portion of light and second image data collected by the second imager array from the second portion of light. In another aspect, the computation module is operable to generate a three dimensional representation of the three dimensional subject from the distance data. Furthermore, in some aspects the imaging system can be incorporated into a computing system operable to alter computation based on variations in distance data derived from movements of a subject.

Additionally, a variety of system configurations are contemplated, which are considered to be non-limiting. In one aspect, the first imager array includes a plurality of pixels architecturally configured as front-side illuminated (FSI) pixels. In another aspect, the second imager array includes a plurality of pixels architecturally configured as FSI pixels or backside illuminated (BSI) pixels.

Furthermore, various structures can be utilized to redirect or otherwise reflect light that passes through the system back into the system. In one aspect, a textured region can be coupled to the second imager array on a side opposite the first imager array, such that the textured region is positioned to redirect light passing through the second imager array back into the second imager array. In another aspect, the system can include a reflector coupled to the second imager array on a side opposite the first imager array, such that the reflector is positioned to reflect light passing through the second imager array back into the second imager array.

The present disclosure additionally provides a method of determining distance to a subject. Such a method can include focusing incident light along an optical pathway onto a first light incident surface of a first imaging array, wherein the first imaging array captures a first portion of the light having at least one wavelength of from about 500 nm to about 1100 nm to generate a first data set and passes through a second portion of the light along the optical pathway. The method can also include receiving the second portion of the light onto a second light incident surface of a second imaging array, wherein the second imaging array captures the second portion of the light having at least one wavelength of from about 500 nm to about 1100 nm to generate a second data set. In another aspect, the first portion of the light has at least one wavelength of from about 750 nm to about 1100 nm and the second portion of the light has at least one wavelength of from about 750 nm to about 1100 nm. Additionally, the distance to the subject can then be derived from variations between the first data set and the second data set. In some aspects, at least part of the second portion of light that passes through the second imaging array can be redirected back into the second imaging array.

The distance between the first imaging array and the second imaging array can vary depending on the wavelengths of light being utilized and the distances to which three dimensional detection is desired. In one aspect, however, the distance between the first light incident surface and the second light incident surface is from about 2 microns to about 150 microns.

In some aspects the method can further include emitting active light radiation toward the subject such that at least a portion of the incident light focused along the optical pathway includes the active light radiation. In one aspect, the active light radiation can be IR light radiation. In another aspect, the active light radiation can have a center frequency selected from 850 nm, 940 nm, and 1064 nm.

In yet another aspect the method can further include generating a three dimensional representation of the subject. In one specific aspect, generating the three dimensional representation can include determining a plurality of distances from the first light incident surface to a surface of the subject at a plurality of locations across the surface of the subject, and using the distances to generate the three dimensional representation.

BRIEF DESCRIPTION OF THE DRAWINGS

For a fuller understanding of the nature and advantage of the present disclosure, reference is being made to the following detailed description of various embodiments and in connection with the accompanying drawings, in which.

DETAILED DESCRIPTION

Figure 1:
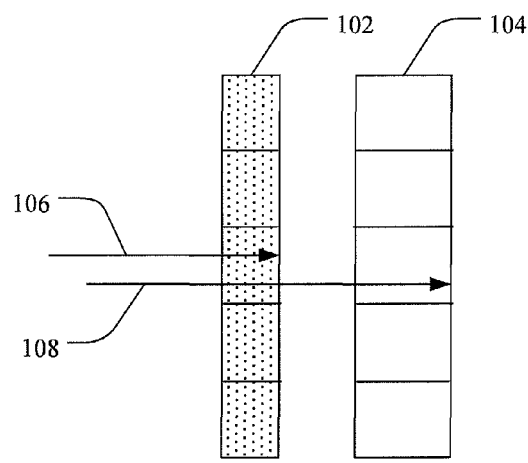
FIG. 1 shows a cross sectional view of a stacked imager in accordance with an aspect of the present disclosure.

Before the present disclosure is described herein, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

Definitions

The following terminology will be used in accordance with the definitions set forth below.

It should be noted that, as used in this specification and the appended claims, the singular forms "a," and, "the" include plural referents unless the context clearly dictates otherwise. Thus, for example, reference to "a dopant" includes one or more of such dopants and reference to "the layer" includes reference to one or more of such layers.

As used herein, the terms "textured region" and "textured surface" can be used interchangeably, and refer to a surface having a topology with nano- to micron-sized surface variations formed by a texturing technique, a few examples of which are discussed herein. While the characteristics of such a surface can be variable depending on the materials and techniques employed, in one aspect such a surface can be several hundred nanometers thick and made up of nanocrystallites (e.g. from about 10 to about 50 nanometers) and nanopores. In another aspect, such a surface can include micron-sized structures (e.g. about 2 μm to about 10 μm). In yet another aspect, the surface can include nano-sized and/or micron-sized structures from about 5 nm and about 10 μm. In yet another aspect the surface features can be from about 100 nm to about 1 μm.

As used herein, the terms "surface modifying" and "surface modification" refer to the altering of a surface of a semiconductor material to form a textured surface using a variety of surface modification techniques. Non-limiting examples of such techniques include plasma etching, reactive ion etching, porous silicon etching, lasing, chemical etching (e.g. anisotropic etching, isotropic etching), nanoimprinting, material deposition, selective epitaxial growth, shallow trench isolation techniques, and the like, including combinations thereof.

As used herein, the term "subject" refers to any object, living or non-living, that has a three dimensional structure or that can be imaged to determine distance. Non-limiting examples can include humans, animals, vehicles, buildings and building structures such as doors, windows, and the like, plants, animal enclosures, geological structures, and the like.

As used herein, the term "backside illumination" (BSI) refers to a device architecture design whereby electromagnetic radiation is incident on a surface of a semiconductor material that is opposite a surface containing the device circuitry. In other words, electromagnetic radiation is incident upon and passes through a semiconductor material prior to contacting the device circuitry.

As used herein, the term "front side illumination" (FSI) refers to a device architecture design whereby electromagnetic radiation is incident on a surface of a semiconductor material containing the device circuitry. In some cases a lens can be used to focus incident light onto an active absorbing region of the device while reducing the amount of light that impinges the device circuitry.

As used herein, the term "light incident surface" refers to a surface of an active semiconductor layer in an imager that is first struck by light entering the imager. As such, other materials that make up an imager or a device containing an imager that are positioned between the incoming light and the active layer should not be considered to be light incident surfaces unless the context clearly indicates otherwise. In the case of multiple imagers stacked upon one another, each imager will have a light incident surface. Distances described herein between light incident surfaces of stacked imagers, for example, represent the distances between the active layer surfaces of each imager that is first struck by incident light on an initial pass through each imager.

In this application, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open ended term, like "comprising" or "including," it is understood that direct support should be afforded also to "consisting essentially of" language as well as "consisting of" language as if stated explicitly, and vice versa. Further, it is to be understood that the listing of components, species, or the like in a group is done for the sake of convenience and that such groups should be interpreted not only in their entirety, but also as though each individual member of the group has been articulated separately and individually without the other members of the group unless the context dictates otherwise. This is true of groups contained both in the specification and claims of this application. Additionally, no individual member of a group should be construed as a de facto equivalent of any other member of the same group solely based on their presentation in a common group without indications to the contrary.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

THE DISCLOSURE

The present disclosure provides devices, systems, and methods for obtaining 3D information from an object. For example, in one aspect two imager arrays can be positioned in a stacked configurations along an optical axis, such that light passes through the first imager sensor having an array of pixels before contacting the second imager sensor having an array of pixels. Such an arrangement is shown schematically in FIG. 1. A first imager array 102 is positioned in a stacked configuration with a second imager array 104. The first imager array 102 captures a first portion of the incident light 106, while the second imager array 104 captures a second portion of the incident light 108 that passes through the first imaging array. It is noted that, while the portions of light are shown as distinct lines in FIG. 1 for clarity, these lines are intended to represent the portion of the overall incident light that is absorbed by each imager array. Thus, light from an object that is being imaged is captured on both imager arrays and will create different image patterns on each imager array that is a function of the distance from each imager array to the object. Differences in these image patterns can thus be utilized to obtain distance and/or 3D information about the object. In some cases a "light field" can be computed giving, for example, the light wavelength, intensity, and direction of light rays passing through the imager. Computations can then performed, in some cases in real time, by an on-chip processing unit or in a system processing unit to provide a variety of data, including visible image, IR image, range or distance to the object, 3D information, and the like. The object distance information collected can also be used to create a three dimensional image of the object.

Figure 2:
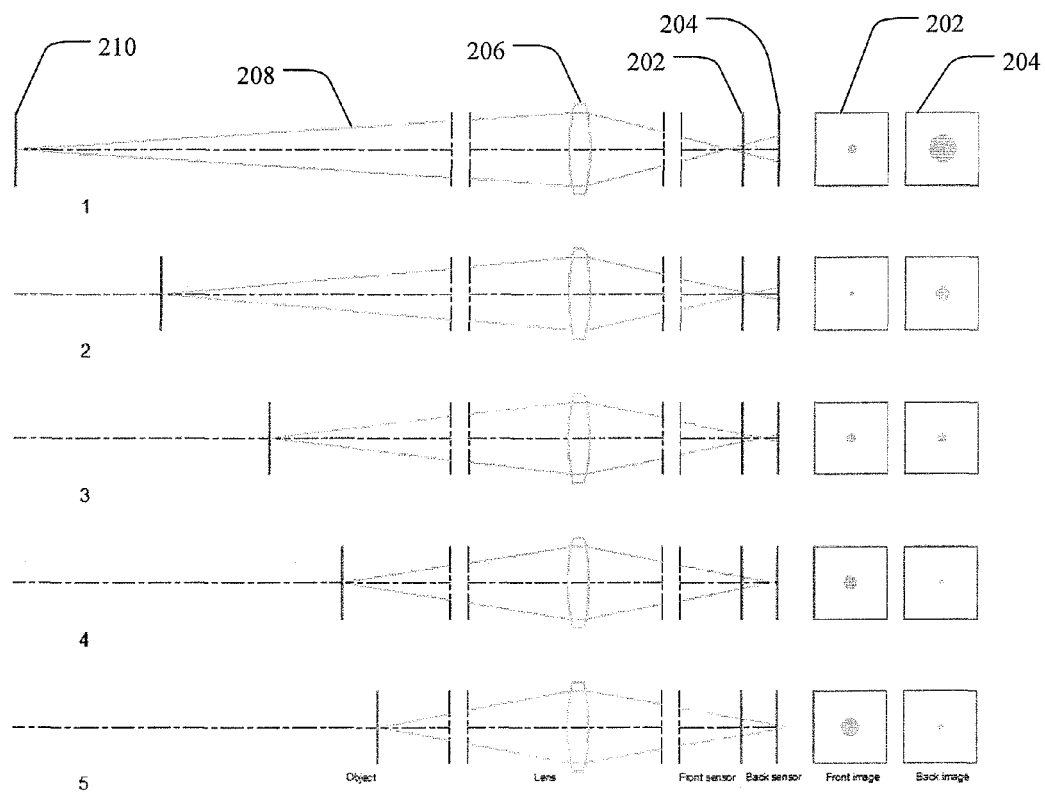
FIG. 2 shows a schematic diagram of the effects of changing distance to a subject on a stacked imager system in accordance with another aspect of the present disclosure.

FIG. 2 shows a side view schematic diagram of such three dimensional imaging at different distances, represented by rows 1-5. The imaging device can include a first imager array 202, a second imager array 204, and a system lens 206 for focusing incident light 208 onto the first and second imager arrays. A subject 210 is shown at a given distance for each of rows 1-5 from the imaging arrays. The boxes shown to the right of the imager arrays represent the imaging surface of each of the arrays, with the imaging surface for the first imaging array 202 being on the left and the imaging surface for the second imaging array 204 being on the right. The circle shown in each of the imaging surfaces represents the image patterns formed on each imaging surface of the subject 208 for a given distance. As is shown in FIG. 2, as the subject moves closer to the imager arrays, the dimensions of the image patterns on the imaging surfaces change as a function of the distance to each imager array. As such, the differences between the image patterns for a given distance can be utilized to calculate the distance to the subject. As the image pattern differences change, the change in distance to the subject can be repeatedly calculated. Furthermore, three dimensional representations can be obtained of subjects, including for subjects with complex surface contours or structures. In such cases, the three dimensional nature of a subject is reflected in the image pattern created on each of the imager arrays. The differences between image patterns from each array can be utilized to create a three dimensional representation. Such a representation can include three dimensional measurements of the subject, as well as three dimensional images.

Figure 3A:
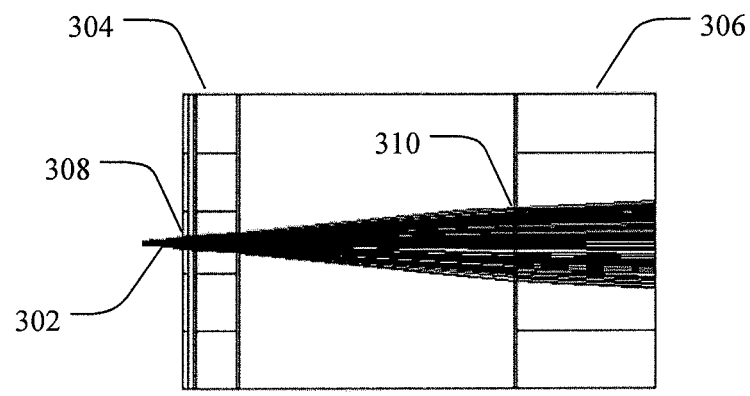
FIG. 3A shows a schematic diagram of the effects of changing distance to a subject on a stacked imager system in accordance with another aspect of the present disclosure.
Figure 3B:
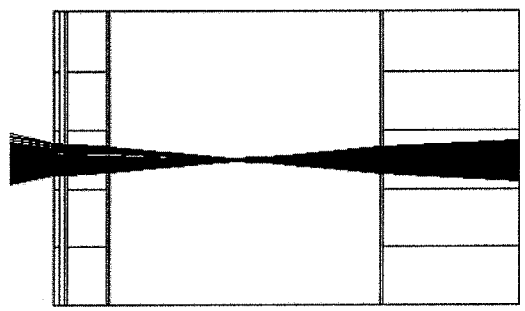
FIG. 3B shows a schematic diagram of the effects of changing distance to a subject on a stacked imager system in accordance with another aspect of the present disclosure.
Figure 3C:
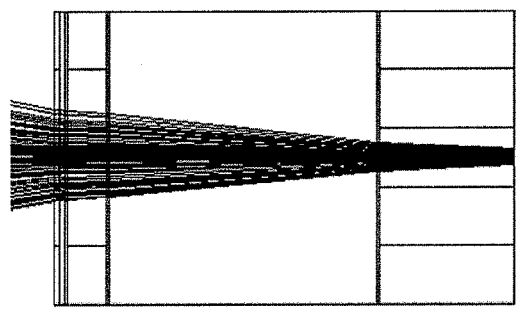
FIG. 3C shows a schematic diagram of the effects of changing distance to a subject on a stacked imager system in accordance with another aspect of the present disclosure.

These concepts are further illustrated in FIGS. 3A-C where incident light 302 is shown passing through a first imager array 304 and a second imager array 306. The incident light 302 contacts the first imager array 304 with a first image pattern 308 that is related, at least in part, to the distance to the subject and the characteristics and distance of the system lens (not shown) from the first imager array 302. Due to the greater distance of the subject and the system lens from the second imager array 306, the second image pattern 310 is different from the first image pattern 308. For example, the patterns will often differ in size between the two arrays, and the pixels that detect the pattern will be different between the two imager arrays. It is noted, however, that in some limited situations the patterns on both imager arrays will be the same size. As the subject moves closer to the imager arrays (FIGS. 3B and 3C), the first and second image patterns concomitantly vary.

The following are exemplary descriptions of techniques that can be utilized to perform such stacked imager array calculations. It should be understood that these techniques are non-limiting, and that the scope of the present disclosure includes any technique for performing such calculations. Accordingly, the distance to a subject can be calculated based on the image feature difference between the first image pattern and the second image pattern of the stacked imager array, with known imager stack structure and system lens data.

In one aspect, distance to a subject with a point or near-point source as well as image features can be calculated directly. Such point or near-point sources will generally produce simple image patters on each imager array. First, the effective image pattern radii of the first image pattern and the second image pattern can be determined as r1 and r2, respectively. The effective feature radii of a defocussed image can be calculated from the total volume of the image pixel values according to Equations I and II:

$$r1 = \text{sqrt}(\text{sum}(\text{pixel\_value\_image1})/(pi*\text{max}(\text{pixel\_value\_image1})) \quad \quad \text{I}$$

$$r2 = \text{sqrt}(\text{sum}(\text{pixel\_value\_image2})/(pi*\text{max}(\text{pixel\_value\_image2})) \quad \quad \text{II}$$

where r1 and r2 are the image radii of the first image pattern and the second image pattern. Pixel values are in the sampling kernels of 5×5 to 10×10 pixels. Optically, with generic imaging system optics, focused images occur at a single plane with the best focal distance relative to the optics for specific subject. At this best focused location, the image is the sharpest with the smallest feature size for any image contents. At any other location, image will be defocused (a blurred image), with feature sizes that are bigger for the same image content at focused location.

Next, the smallest image size location from the first image based on the feature radii of the first image pattern and the second image pattern is calculated by Equation III:

$$d = r1*t/(r1+r2) \quad \quad \text{III}$$

where d is the distance from the first image, r1 and r2 are the effective feature radii of the first image and second image, and t is the separation between the first light incident surface and second light incident surface. The smallest image feature size location is at the best focus location, where image is focused with minimum blur. Depending on the design of the system, for some aspects including a mix of front side illuminated and back side illuminated imagers, an offset may be introduced to compensate for the difference in the distance from the front of the image array to the effective image plane.

The subject distance can then be calculated using the lens imaging Equation IV:

$$D=1/(1/f-1/(s+d)) \qquad \text{IV}$$

where D is the distance from the subject to the lens' principle plane, f is the focal length of the imaging lens, s is the distance from lens principle plane to the first image, and d is the distance from the first image to the smallest image location. In some aspects the actual distance calculation can consider the image stack layer material refractive index because the actual distance in the non-air material will be, according to Equation V:

$$\text{(Distance in material)}=\text{(distance in air)}*\text{(material refractive index)} \qquad \text{V}$$

Furthermore, the x and y position of an image feature in an imager array used in distance calculation can be calculated using a centroid, as is shown by Equations VI and VII:

$$xc=\text{sum}(x*\text{(pixel value)})/\text{sum}(\text{pixel value}) \qquad \text{VI}$$

$$yc=\text{sum}(y*\text{(pixel value)})/\text{sum}(\text{pixel value}) \qquad \text{VII}$$

It is noted that the centroid xc and yc position is not limited by the pixel resolution, as x and y are pixel coordinates. Sub-pixel result can be used to achieve required calculation precision. The precision of the position can be sensor signal-to-noise ratio limited.

For a non-point object source, image feature size can be determined by cross correlation between the inverse scaled first image and second image. First, the inverse scaled cross correlation is calculated according to Equation VIII:

$$C=\text{sum}((\text{Inverse scaled first image pixel values})* \text{(second image pixel value)}) \qquad \text{VIII}$$

where C is the result of the inverse scaled correlation. The inverse scaled first image is processed by applying the inverse scale factor k to the image size (similar to a digital zoom). Again, the scaling is not pixel resolution limited, and sub-pixel scaling process is used to find the best correlated scale factor k with the highest correction result C.

The best correlated scale factor k can then be used to describe the relationship between the first image and the second image. The image distance from the first image than can be calculated as according to Equation IX:

$$d=r1*t/(r1+r2)=r1*t/(r1+k*r1)=t/(1+k) \qquad \text{IX}$$

where d is the image distance from first image to the smallest image size location, t is the separation between first light incident surface and second light incident surface, and k is the scale factor applied to the first image in cross correlation. Depending on the design of the system, for some aspects including a mix of front side illuminated and back side illuminated imagers, an offset may be introduced to compensate for the difference in the distance from the front of the image array to the effective image plane.

The distance to the subject can then be calculated according to Equation X:

$$D=1/(1/f-1/(s+d)) \qquad \text{X}$$

where D is the distance from the subject to the lens principle plane, f is the focal length of the imaging lens, s is the distance from lens principle plane to the first image, and d is the distance from first image to the smallest image location. Again, compensation can be made for the refractive index of the imager array material.

A variety of configurations are contemplated for carrying out the calculations utilized to derive distance and/or three dimensional information from a subject. For example, in one aspect the calculations or at least a portion of the calculations can be performed on-chip with the imager arrays. In another aspect, a dedicated image processing unit can be utilized for the calculations or at least a portion of the calculations. In other aspects, the calculations or at least a portion of the calculations can be performed in a computing device.

Figure 4:
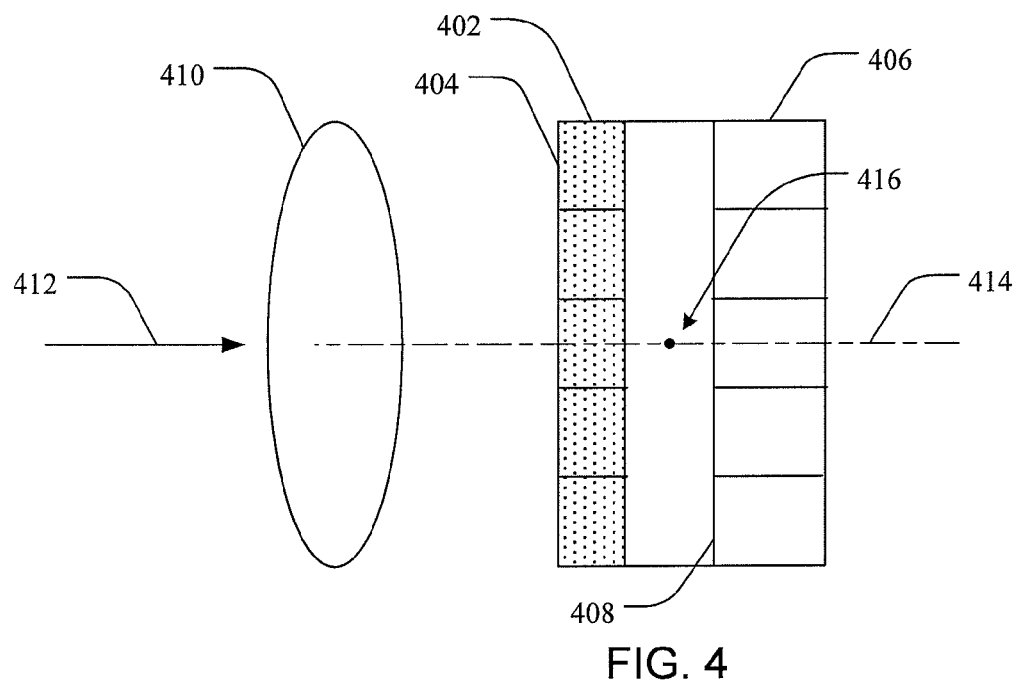
FIG. 4 shows a cross sectional view of a stacked imager system in accordance with an aspect of the present disclosure.

Turning to various physical configurations of the system, in one aspect an imaging system capable of deriving three dimensional information from a three dimensional subject can, as is shown in FIG. 4, include a first imager array 402 having a first light incident surface 404 and a second imager array 406 having a second light incident surface 408. The second imager array 406 is coupled to the first imager array 402 at a surface that is opposite the first light incident surface 404. It is noted that in one aspect the first imager array can be physically coupled to the second imager array. In another aspect, the first imager array can be optically coupled to the second imager array. Furthermore, the second light incident surface 408 is oriented toward the first imager array 402 and at least substantially uniformly spaced at a distance of from about 2 microns to about 150 microns from the first light incident surface. The system can additionally include a system lens 410 positioned to direct incident light 412 along an optical pathway 414 onto the first light incident surface 404. In some aspects, the system lens 410 can have a focal point 416 located in between the first light incident surface 404 and the second light incident surface 408, and/or in between the first imager array 402 and the second imager array 406. The first imager array 402 is operable to detect a first portion of the light passing along the optical pathway 414 and to pass through a second portion of the light, and the second imager array 406 is operable to detect at least a part of the second portion of light. In some aspects the first portion of light and the second portion of light have at least one wavelength of from about 500 nm to about 1100 nm. In another aspect, the first portion of light and the second portion of light have at least one wavelength of from about 750 nm to about 1100 nm. In another aspect, the second portion of light includes at least substantially all wavelengths of light of from about 750 nm to about 1100 nm. In a further aspect, the first portion of light and the second portion of light have a center wavelength frequency between about 500 nm and about 1100 nm. In another aspect, the first portion of light and the second portion of light have a center wavelength frequency between about 750 nm and about 1100 nm.

The wavelengths of light utilized by the stacked imager system can vary depending on, among other things, the design of the system and the intended application. In some aspects the same or substantially the same light wavelengths can be utilized by both the first imager array and the second imager array to derive distance and/or three dimensional information from the subject. In other aspects, different light wavelengths can be utilized by the first imager array than by the second imager array. While in many aspects IR light wavelengths are used to calculate three dimensional information about a subject, in some aspects visible light can be used to make such calculations. For example, assuming crystalline silicon imagers are utilized for the imager arrays, light in the visible spectrum of from about 500 nm to about 700 nm can be used, provided the first imaging array is sufficiently thin to allow a second portion of the visible light to pass there through. Furthermore, in some cases different wavelengths of light can be utilized differently in the system. For example, infrared light can be used by both the first imager array and the second imager array to generate a three dimensional representation or three dimensional image, while visible light can be captured by the first imager array in order to generate a visible image of the subject. When the two representations are combined, a resulting three dimensional visible image of the subject can be achieved.

In another aspect, system can include an active illumination source, a first imager capable of detecting visible and infrared (IR) light and a second imager capable of detecting IR light. The system can further include an active illumination source capable of emitting IR light. The active illumination source, first imager and the second imager can pulsed at the same frequency such that the pulsed IR light is detected during the pulse window. When the IR illumination source is off (i.e. in between pulses), the first image sensor is detecting and reading out visible light data.

Additionally, in some aspects the one or more of the first and second imager arrays can include light filters that are capable of filtering out specific wavelengths of light or ranges of wavelengths of light. As such, light having a certain wavelength or wavelength range can be concentrated by a structure such as a system lens on a specific imager array or even a portion of an imager array. In one aspect, an IR cut filter (moveable) or notch filter can be employed in front one or more pixels of the first imager array. Such a filter can pass infrared light that will be used in range or distance determination and filter out light in the visible range. In some cases a long-pass filter can pass both infrared and visible red light. Similarly, a long-pass filter can be utilized that passes green, red, and infrared light. In other aspects, a band-pass filter can be used that passes visible light and specific wavelengths of IR light, such as, for example, 850 nm, 940 nm, and/or 1064 nm light, while blocking all other wavelengths.

It is additionally contemplated that in one aspect the system can include a focusing system for altering the focal plane(s) of the imaging system. While various techniques are contemplated, in one aspect the distance of the first imager array from the second imager array can be varied by, for example, piezoelectric materials.

In some aspects, the system can additionally include an active light emitter configured to emit active light radiation at least substantially toward the subject. While any light can be utilized as an active light source, in one aspect the active light source can emit light having a center wavelength in the infrared range. In another aspect, the emitted light can have a center wavelength of from about 750 nm to about 1100 nm. In yet another aspect, the active light radiation can have a center frequency selected from 850 nm, 940 nm, 1064 nm, or a combination thereof.

As has been described, in some aspects the system can include a computational module that is operable to calculate distance data from the imaging system to the three dimensional subject using first image data collected by the first imager array from the first portion of light and second image data collected by the second imager array from the second portion of light. Computational modules are well known, and can include various processing units, data storage, memory, I/O functionality, and the like. In one aspect the computation module is capable of generating a three dimensional representation of the subject from the distance data. In another aspect the computational module can generate a three dimensional image from the data derived from the first imager array and the second imager array. In other aspects, the imaging system can be incorporated into a computing system operable to alter computation based on variations in distance data derived from movements of a subject. For example, in the case of a human subject, motions made by the subject can be captured by the imaging system and used by the computing system to alter the computation of the computing system. In the case of non-living subjects, computation of the computing system can be varied according to the motion of an oncoming vehicle or other moving subject.

Returning to the imager system configuration, in one aspect the distance from the first light incident surface to the second light incident surface is from about 1 microns to about 150 microns. In another aspect, aspect the distance from the first light incident surface to the second light incident surface is from about 10 microns to about 100 microns. In a further aspect, the distance from the first light incident surface to the second light incident surface is from about 1 micron to about 50 microns. Furthermore, each of the first and second imager array is made up of a plurality of pixels. The pixels can be architecturally configured as front-side illuminated pixels or back-side illuminated pixels. For example, in one aspect all of the first imager array pixels and the second imager array pixels can be front-side illuminated pixels. In another aspect, all of the first imager array pixels can be front-side illuminated and all of the second imager array pixels can be backside illuminated pixels. Additionally, it is contemplated that in some aspects either of the first or second imager arrays can be front-side illuminated while the other imager array can be backside illuminated.

Figure 5:
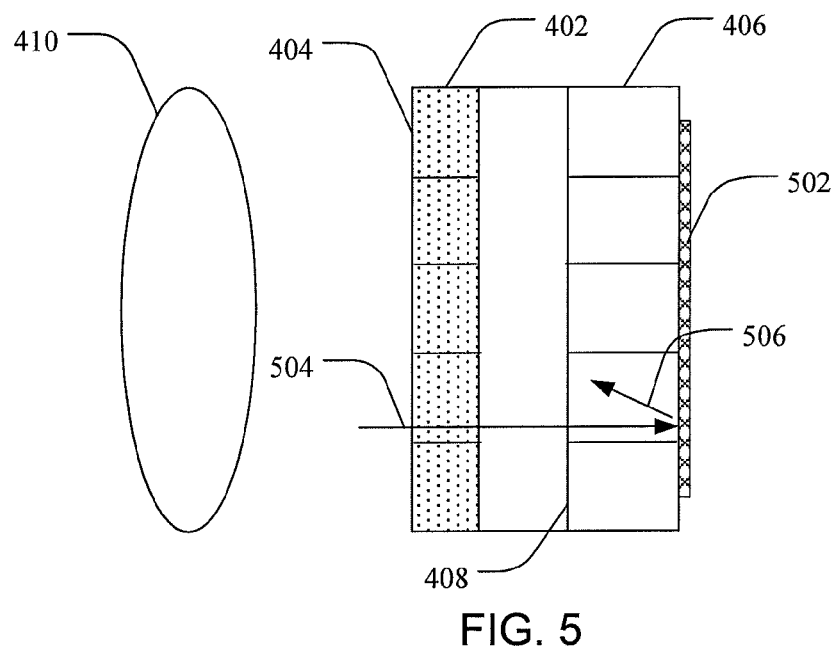
FIG. 5 shows a cross sectional view of a stacked imager system in accordance with an aspect of the present disclosure.

Furthermore, as is shown in FIG. 5, in some aspects a system can include a texture region 502 coupled to the second imager array 406 on a side opposite the first imager array 402. In this case, the textured region 502 is positioned to redirect light passing through the second imager array 406 back into the second imager array 406. The light passing through the second imager array is shown at 504, and the light redirected back into the imager array is shown at 506. It is noted that the textured region 502 can be formed across all or substantially all of the back surface of the second imager array 406, or the textured region 502 can be formed on a portion thereof. Additionally, in some aspects the textured region can be formed at the level of the pixels that make up the imager array, and as such, can be formed on a portion of the pixel surface, substantially all of the pixel surface, or all of the pixel surface. Also, it is noted that callout numbers used in FIG. 5 from previous figures denote the same or similar structures as the previous figure. Furthermore, in some aspects a textured region is explicitly disclaimed from being applied to the first imager array, while in other aspects such a textured region can be utilized.

The textured region can function to diffuse electromagnetic radiation, to redirect electromagnetic radiation, and/or to absorb electromagnetic radiation, thus increasing the efficiency of the second imager array. The textured region can include surface features to thus increase the optical path length of the second imager array. Such surface features can be micron-sized and/or nano-sized, and can be any shape or configurations. Non-limiting examples of such shapes and configurations include cones, pillars, pyramids, microlenses, quantum dots, inverted features, gratings, protrusions, and the like, including combinations thereof. Additionally, factors such as manipulating the feature sizes, dimensions, material type, dopant profiles, texture location, etc. can allow the diffusing region to be tunable for a specific wavelength or wavelength range. Thus in one aspect, tuning the device can allow specific wavelengths or ranges of wavelengths to be absorbed.

As has been described, textured regions according to aspects of the present disclosure can also allow an imager array to experience multiple passes of incident electromagnetic radiation within the device, particularly at longer wavelengths (i.e. infrared). Such internal reflection increases the optical path length to be greater than the thickness of the semiconductor. This increase in the optical path length increases the quantum efficiency of the device, leading to an improved signal to noise ratio.

The textured region can be formed by various techniques, including plasma etching, reactive ion etching, porous silicon etching, lasing, chemical etching (e.g. anisotropic etching, isotropic etching), nanoimprinting, material deposition, selective epitaxial growth, shallow trench isolation, and the like. One effective method of producing a textured region is through laser processing. Such laser processing allows discrete locations of the imager array or other substrate to be textured. A variety of techniques of laser processing to form a textured region are contemplated, and any technique capable of forming such a region should be considered to be within the present scope. Examples of such processing have been described in further detail in U.S. Pat. Nos. 7,057,256, 7,354,792 and 7,442,629, which are incorporated herein by reference in their entireties. Briefly, a surface of a substrate material is irradiated with laser radiation to form a textured or surface modified region.

The type of laser radiation used to surface modify a material can vary depending on the material and the intended modification. Any laser radiation known in the art can be used with the devices and methods of the present disclosure. There are a number of laser characteristics, however, that can affect the texturing process and/or the resulting product including, but not limited to the wavelength of the laser radiation, pulse width, pulse fluence, pulse frequency, polarization, laser propagation direction relative to the semiconductor material, etc. In one aspect, a laser can be configured to provide pulsatile lasing of a material. A short-pulsed laser is one capable of producing femtosecond, picosecond and/or nanosecond pulse durations. Laser pulses can have a central wavelength in a range of about from about 10 nm to about 8 µm, and more specifically from about 200 nm to about 1200 nm. The pulse width of the laser radiation can be in a range of from about tens of femtoseconds to about hundreds of nanoseconds. In one aspect, laser pulse widths can be in the range of from about 50 femtoseconds to about 50 picoseconds. In another aspect, laser pulse widths can be in the range of from about 50 picoseconds to 100 nanoseconds. In another aspect, laser pulse widths are in the range of from about 50 to 500 femtoseconds. In another aspect, laser pulse widths are in the range of from about 10 femtoseconds to about 500 picoseconds.

The number of laser pulses irradiating a target region can be in a range of from about 1 to about 2000. In one aspect, the number of laser pulses irradiating a target region can be from about 2 to about 1000. Further, the repetition rate or frequency of the pulses can be selected to be in a range of from about 10 Hz to about 10 µHz, or in a range of from about 1 kHz to about 1 MHz, or in a range from about 10 Hz to about 1 kHz. Moreover, the fluence of each laser pulse can be in a range of from about 1 kJ/m² to about 20 kJ/m², or in a range of from about 3 kJ/m² to about 8 kJ/m².

In another aspect of the present disclosure, an imaging system can further include a reflector coupled to the second imager array on a side opposite the first imager array. The reflector can be positioned to reflect light passing through the second imager array back into the second imager array. Numerous reflector materials are contemplated, and can include any material or composite of materials that can function to reflect light. Non-limiting examples of such materials can include metals, metal alloys, ceramics, polymers, glass, quartz, Bragg-type reflectors, and the like.

Figure 6A:
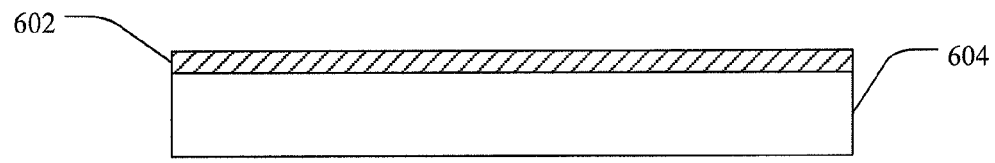
FIG. 6A shows a cross sectional view of various steps in the manufacture of a stacked imager in accordance with another aspect of the present disclosure.

FIGS. 6A-E show various steps in the non-limiting manufacture of a stacked imager structure according to one aspect of the present disclosure. As is shown in FIG. 6A, for example, first imager array 602 is formed on the front side of a semiconductor layer 604. The first imager array 602 can include any form of imager array that can be incorporated into an imager system, and any such device is considered to be within the present scope. A variety of semiconductor materials are contemplated for use as the semiconductor layer of the devices and methods according to aspects of the present disclosure. As such, any semiconductor material that can be used in a stacked imager device is considered to be within the present scope. Non-limiting examples of such semiconductor materials can include group IV materials, compounds and alloys comprised of materials from groups II and VI, compounds and alloys comprised of materials from groups III and V, and combinations thereof. More specifically, exemplary group IV materials can include silicon, carbon (e.g. diamond), germanium, and combinations thereof. Various exemplary combinations of group IV materials can include silicon carbide (SiC) and silicon germanium (SiGe). In one specific aspect, the semiconductor material can be silicon. In another specific aspect, the semiconductor layer can be a silicon wafer. The silicon wafer/material can be monocrystalline, multicrystalline, microcrystalline, amorphous, and the like. In one specific aspect, the silicon material can be a monocrystalline silicon wafer.

Figure 6B:
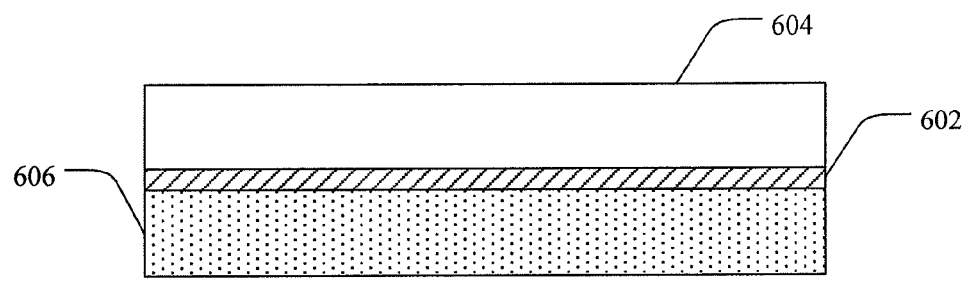
FIG. 6B shows a cross sectional view of various steps in the manufacture of a stacked imager in accordance with another aspect of the present disclosure.

Turning to FIG. 6B, a carrier substrate (or handle) 606 can be bonded to the first imager array 602. Note that in FIG. 6B, the device has been flipped or rotated 180° as compared to FIG. 6A. The carrier substrate can include a variety of materials. Because in many aspects the carrier substrate 606 is a temporary substrate to be removed at a later processing step, the material can be chosen based on its usefulness as a temporary substrate. It can also be beneficial for the carrier substrate 606 to be capable of adequately holding the first imager array 602 during processing of the semiconductor layer 604 and yet be capable of easy removal. Non-limiting examples of potential carrier substrate materials can include glass, ceramics, semiconductors, and the like, including combinations thereof.

Various bonding techniques are contemplated for attaching the carrier substrate 606 to the first imager array 602, and any such bonding technique useful in making a stacked imager device is considered to be within the present scope. One such process can include a liquid UV curable adhesive process that utilizes solids acrylic adhesives designed for temporary bonding of semiconductor wafers to a glass carrier substrate. This technique provides a rigid, uniform support surface that minimizes stress on the wafer during the subsequent processing steps, resulting in less warpage, cracking, edge chipping and higher yields. Other exemplary methods can include bonding and detaching a temporary carrier used for handling a wafer during the fabrication of semiconductor devices, includes bonding the wafer onto the carrier through an adhesive layer. After detaching the carrier from the wafer, the first adhesive layer remaining on the wafer is removed. In another method, bonding at low or room temperature can include surface cleaning and activation by cleaning or etching, followed by polishing the surfaces to be bonded to a high degree of smoothness and planarity. Reactive ion etching or wet etching is used to slightly etch the surfaces being bonded. The etched surfaces may be rinsed in solutions such as ammonium hydroxide or ammonium fluoride to promote the formation of desired bonding species on the surfaces.

In one aspect, the first imager array 602 and the carrier substrate 606 can be bonded at room temperature and a thermal treatment can be applied to consolidate the bonding interface. The parameters of the consolidation annealing can be controlled to provide a bonding energy high enough for the hetero structure to withstand post-bonding conventional process steps (e.g. CMOS processing). In one specific aspect, the bonding technique can include various oxide-oxide, oxide-silicon, or metal-metal bonding methods.

Some bonding processes can achieve a bond strength of at least 1 J/m$^2$ at room temperature. For even higher bond strengths, a bake cycle at 100°-300° C. can be utilized. Some of these oxide-oxide bonding process have been described in U.S. Pat. No. 7,871,898 and U.S. Pat. No. 5,843,832, which are incorporated by reference in their entireties. One method of direct bonding a silicon wafer onto an insulated wafer in order to obtain a stacked imager device is similar to the bonding of two silicon wafers together, with the exception that before bonding a thin thermal oxide layer (e.g. about 1 micron) is grown on one of the wafers.

Release of the carrier substrate from the device layer can vary depending on the attachment process. Acrylic adhesives, for example, can be released by exposure to UV light. More permanent bonds, such as silicon-oxide bonds may require the removal of the carrier substrate by mechanical grinding and/or chemical etching to expose the device layer.

Figure 6C:
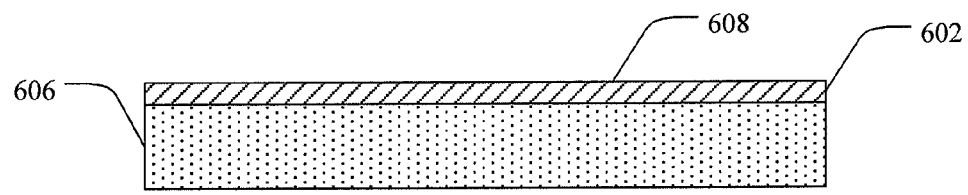
FIG. 6C shows a cross sectional view of various steps in the manufacture of a stacked imager in accordance with another aspect of the present disclosure.

Turning to FIG. 6C, the semiconductor layer 604 (FIG. 6B) is at least partially removed (e.g. polished and thinned) to expose the backside of the first imager array 602 or, in other words, to form a processed surface 608 at the backside of the first imager array 602. Thus, the resulting structure is comprised of the first substrate 606 coupled to the first imager array 602. At this point, any necessary or beneficial backside processing can be performed on the processed surface 608 of the first imager array 602. Such beneficial backside processing can include, without limitation, shallow or deep trench formation, via formation, annealing, implantation, and the like.

In one aspect, backside processing can also include exposing contact pads associated with the first imager array. By opening the backside of the device layer (i.e. at the processed surface), such electrical contacts can be exposed for bonding and providing electrical contact to subsequent structures, such as the second imager array (see below). Opening the backside can occur by any known technique, including the thinning and processing methods described. In one specific aspect, opening the backside can be accomplished via plasma etching.

Any technique useful for removing the semiconductor layer 604 is considered to be within the present scope. Non-limiting examples can include ion implantation/separation processes, laser ablation, laser splitting, CMP processing, dry etching, wet etching and the like, including combinations thereof. In one specific aspect, the semiconductor layer is removed by CMP techniques to expose the device layer 602.

Figure 6D:
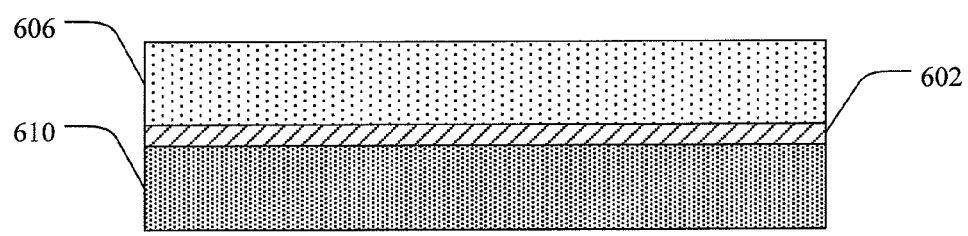
FIG. 6D shows a cross sectional view of various steps in the manufacture of a stacked imager in accordance with another aspect of the present disclosure.

Following removal or thinning of the semiconductor layer 604, a second imager array 610 is bonded to the backside of the first imager array 602, as is shown in FIG. 6D. Note that in FIG. 6D, the device has been flipped or rotated by 180° compared to FIG. 6C. Any bonding technique can be utilized to bond the second imager array 210 to the first imager array 202, as was described for the bonding of the first substrate 206 to the first imager array 202 (FIG. 6B), provided the process is compatible with both structures. It is noted that any spacing that exists between the first and second imager arrays can be filled with a light transparent material such as amorphous silicon, an oxide, nitride, or the like. In some aspects an air gap can be maintained between the first and second imager arrays. Such a gap can be filled with actual air, an inert gas, a vacuum, etc.

Additionally, it is noted that the first imager array and the second imager array can be electrically coupled to, and thus can function in conjunction with, one another. Such electrical coupling can be accomplished by vias formed through the processed surface that connect the two imager arrays.

Figure 6E:
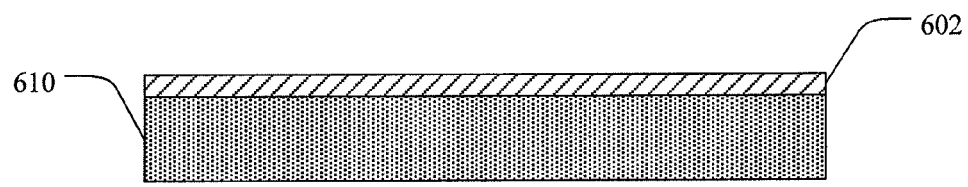
FIG. 6E shows a cross sectional view of various steps in the manufacture of a stacked imager in accordance with another aspect of the present disclosure.

Turning to FIG. 6E, in some aspects the carrier substrate 606 (FIG. 6D) can be removed from the first imager array 602 following bonding of the second imager array 610. Thus, the resulting stacked imager structure shown in FIG. 6E includes a second imager array 610 bonded to a first imager array 602.

Figure 7A:
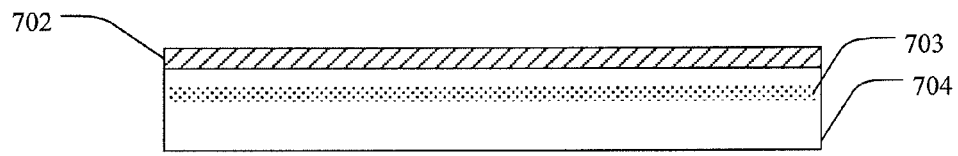
FIG. 7A shows a cross sectional view of various steps in the manufacture of a stacked imager in accordance with another aspect of the present disclosure.

In another aspect, FIGS. 7A-E show various steps in the manufacture of a stacked imager device using an embedded oxide layer to facilitate thinning and creating a space between the imager arrays. As is shown in FIG. 7A, for example, first imager array 702 can be formed on the front side of a semiconductor layer 704. The first imager array 702 can include any form of imager array that can be incorporated into a stacked imager device, as has been described. A thin oxide layer 703 can be embedded within the semiconductor layer 704, either before or after the formation of the first imager array 702. The thin oxide layer can be of any shape and thickness useful for the particular device design. In some aspects, however, the thin oxide layer can be from about 4000 angstroms to about 1.5 microns thick. It is also noted that commercial SOI substrates can be used that are manufactured having such a thin oxide layer embedded.

Figure 7B:
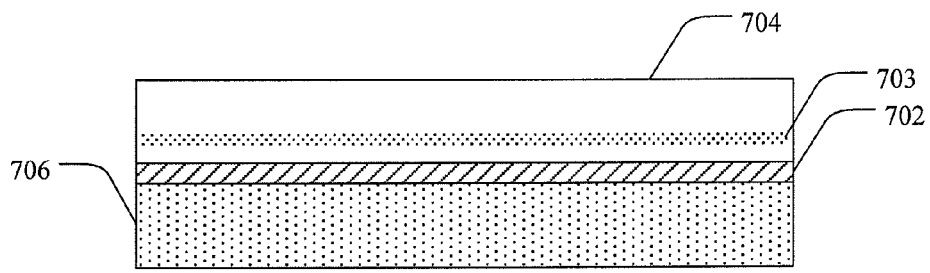
FIG. 7B shows a cross sectional view of various steps in the manufacture of a stacked imager in accordance with another aspect of the present disclosure.

Turning to FIG. 7B, a carrier substrate 706 can be bonded to the first imager array 702. Note that in FIG. 7B, the device has been flipped or rotated 180° as compared to FIG. 7A. The carrier substrate can include a variety of materials. Because in most aspects the carrier substrate 706 is a temporary substrate to be removed at a later processing step, the material can be chosen based on its usefulness as a temporary substrate.

Figure 7C:
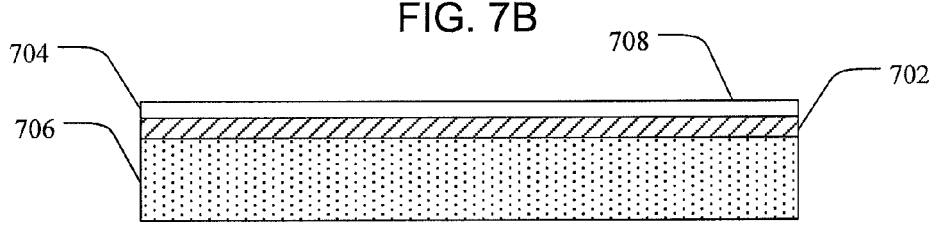
FIG. 7C shows a cross sectional view of various steps in the manufacture of a stacked imager in accordance with another aspect of the present disclosure.

Turning to FIG. 7C, the semiconductor layer 704 (FIG. 7B) is at least partially removed to form a processed surface 708 near the backside of the first imager array 702. In one aspect, the semiconductor layer 704 can be removed at least to the thin oxide layer 703. In some aspects at least a portion of the thin oxide layer can remain, while in other aspects the thin oxide layer can be completely removed from the semiconductor layer. This material can be removed by any known method, such as, for example, laser splitting, polishing, thinning, etching, lapping or grinding, CMP processing, or a combination thereof.

Thus, the resulting structure is comprised of the carrier substrate 706 coupled to the first imager array 702. A portion of the semiconductor layer 704 can remain coupled to the first imager array 702 opposite the carrier substrate 706. At this point, any necessary or beneficial backside processing can be performed on the first imager array 702. In one specific aspect, processing the semiconductor layer on the backside can include implant and/or laser anneal conditions to reduce surface defects.

Figure 7D:
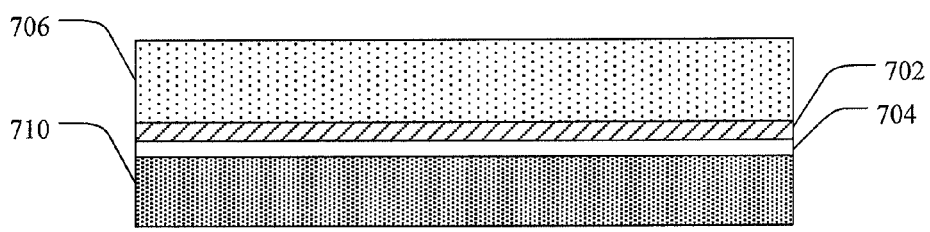
FIG. 7D shows a cross sectional view of various steps in the manufacture of a stacked imager in accordance with another aspect of the present disclosure.

Following thinning of the semiconductor layer 704, a second imager array 710 can be bonded to the semiconductor layer 704 at backside of the first imager array 702, as is shown in FIG. 7D. Note that in FIG. 7D, the device has been flipped or rotated 180° compared to FIG. 7C. Any bonding technique can be utilized to bond the second imager array 710 to the semiconductor layer 704, as has been described.

Figure 7E:
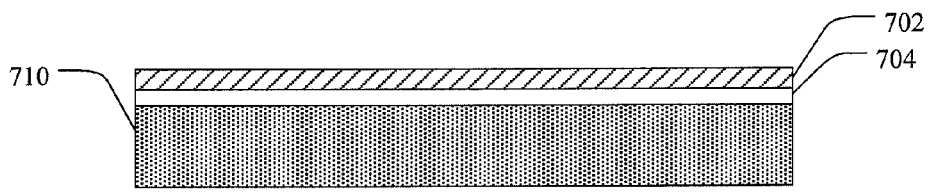
FIG. 7E shows a cross sectional view of various steps in the manufacture of a stacked imager in accordance with another aspect of the present disclosure.

Turning to FIG. 7E, in some aspects the carrier substrate 706 (FIG. 7D) can be removed from the first imager array 702 following bonding of the second imager array 710. Thus, the resulting stacked imager structure shown in FIG. 7E includes a second imager array 710 bonded to the semiconductor layer 704, which is bonded to the first imager array 702. It is noted that the distance between the imagers can be varied during manufacture by varying the thickness of the semiconductor layer 704 that remains and is bonded between the imager arrays.

The present disclosure additionally provides methods of determining distance to a subject. In one aspect, for example, such a method can include focusing incident light along an optical pathway onto a first light incident surface of a first imaging array, where the first imaging array captures a first portion of the light having at least one wavelength of from about 500 nm to about 1100 nm to generate a first data set and passes through a second portion of the light along the optical pathway. The method can also include receiving the second portion of the light onto a second light incident surface of a second imaging array, where the second imaging array captures the second portion of the light having at least one wavelength of from about 500 nm to about 1100 nm to generate a second data set. Furthermore, the distance to the subject can be derived from variations between the first data set and the second data set. In another aspect the method can also include redirecting at least part of the second portion of the light that passes through the second imaging array back into the second imaging array.

In another aspect, the present disclosure provides an imaging system capable of deriving three dimensional information from a three dimensional subject. Such a system can include an active illumination source capable of emitting pulsed infrared light, a first imager capable of detecting visible and infrared light, and a second imager capable of detecting infrared light. The active illumination source, first imager, and the second imager can be pulsed at a frequency and duty cycle such that the pulsed infrared light is detected by the first imager and the second imager when the active illumination is on. In one aspect the first imager is operable to detect visible light when the active illumination source is in an off state.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been described above with particularity and detail in connection with what is presently deemed to be the most practical embodiments of the disclosure, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. An imaging system capable of deriving three dimensional information from a three dimensional subject, comprising:
   a first imager array having a first light incident surface;
   a second imager array having a second light incident surface, the second imager array being coupled to the first imager array at a surface that is opposite the first light incident surface, the second light incident surface being oriented toward the first imager array and at least substantially uniformly spaced at a distance of from 2 microns to 150 microns from the first light incident surface;
   a system lens positioned to direct incident light along an optical pathway onto the first light incident surface, wherein the first imager array is operable to detect a first portion of the light passing along the optical pathway and to pass through a second portion of the light, wherein the second imager array is operable to detect at least a part of the second portion of light, and wherein the first portion of light and the second portion of light have at least one wavelength of from 500 nm to 1100 nm; and
   a computation module configured to receive first image data collected by the first imager array from the first portion of light and second image data collected by the second imager array from the second portion of light, wherein the computation module is operable to calculate distance data from the imaging system to the three dimensional subject based on a difference in at least one dimension of a first image pattern indicated by the first image data and the corresponding dimension of a second image pattern indicated by the second image data.

2. The system of claim 1, wherein the first portion of light and the second portion of light have at least one wavelength of from 750 nm to 1100 nm.

3. The imaging system of claim 1, further comprising an active light emitter configured to emit active light radiation at least substantially toward the three dimensional subject and having a center wavelength of from 750 nm to 1100 nm.

4. The imaging system of claim 1, wherein the computation module is operable to generate a three dimensional representation of the three dimensional subject from the distance data based on variations between the first image pattern and the second image pattern.

5. The imaging system of claim 1, wherein the imaging system is incorporated into a computing system operable to alter computation based on variations in distance data derived from movements of a subject.

6. The imaging system of claim 1, wherein the distance between the first light incident surface and the second light incident surface is from 10 microns to 100 microns.

7. The imaging system of claim 1, wherein the first imager array is operable to capture a visible light image.

8. The imaging system of claim 1, further comprising a reflector coupled to the second imager array on a side opposite the first imager array, wherein the reflector is positioned to reflect light passing through the second imager array back into the second imager array.

9. The imaging system of claim 1, wherein the system lens has a focal point located in between the first light incident surface and the second light incident surface.

10. The system of claim 1, wherein a size of the three dimensional object is determined by the computation module based on a cross correlation between an inverse scaled first image generated from the first image data and a second image generated from the second image data.

11. The imaging system of claim 1, further comprising a textured region coupled to the second imager array on a side opposite the first imager array, wherein the textured region is positioned to redirect light passing through the second imager array back into the second imager array.

12. The system of claim 11, wherein the first imager array does not include a textured region.

13. A method of determining distance to a subject, comprising:
focusing incident light along an optical pathway onto a first light incident surface of a first imaging array, wherein the first imaging array captures a first portion of the light having at least one wavelength of from 500 nm to 1100 nm to generate a first data set and allows passage of a second portion of the light along the optical pathway;
receiving the second portion of the light onto a second light incident surface of a second imaging array, wherein the second imaging array captures the second portion of the light having at least one wavelength of from 500 nm to 1100 nm to generate a second data set; and
deriving the distance to the subject from a variation in at least one dimension between a first image pattern indicated by the first data set and a second image pattern indicated by the second data set.

14. The method of claim 13, further comprising redirecting at least part of the second portion of the light that passes through the second imaging array back into the second imaging array.

15. The method of claim 13, wherein the first portion of the light has at least one wavelength of from 750 nm to 1100 nm and the second portion of the light has at least one wavelength of from 750 nm to 1100 nm.

16. The method of claim 13, further comprising emitting active light radiation toward the subject such that at least a portion of the incident light focused along the optical pathway includes the active light radiation.

17. The method of claim 13, further comprising providing an input into a computing system and altering computation of the computing system based on variations in distance data derived from movements of the subject.

18. The method of claim 13, further comprising deriving a size of the subject via a cross correlation between an inverse scaled first image generated from the first data set and a second image generated from the second data set.

19. The method of claim 13, further comprising generating a three dimensional representation of the subject due to variations between the first image pattern and the second image pattern.

20. The method of claim 19, wherein generating the three dimensional representation includes combining image data gathered by the first imager array with distance data derived from differences between data gathered by the first imager array and the second imager array.

21. The method of claim 13, wherein a textured region is coupled to the second imager array on a side opposite the first imager array, wherein the textured region is positioned to redirect light passing through the second imager array back into the second imager array.

22. The method of claim 21, wherein a textured region is not coupled to the first imager array.

* * * * *